(12) United States Patent
Decorby

(10) Patent No.: US 8,503,849 B2
(45) Date of Patent: Aug. 6, 2013

(54) CHANNEL ASSEMBLIES

(75) Inventor: Raymond George Decorby, Edmonton (CA)

(73) Assignee: The Governors of the University of Alberta, Edmonton, Alberta (CA)

(*) Notice: Subject to any disclaimer, the term of this patent is extended or adjusted under 35 U.S.C. 154(b) by 625 days.

(21) Appl. No.: 12/593,369

(22) PCT Filed: Mar. 27, 2008

(86) PCT No.: PCT/CA2008/000572
§ 371 (c)(1),
(2), (4) Date: Dec. 15, 2009

(87) PCT Pub. No.: WO2008/116310
PCT Pub. Date: Oct. 2, 2008

(65) Prior Publication Data
US 2010/0158437 A1    Jun. 24, 2010

Related U.S. Application Data

(60) Provisional application No. 60/908,239, filed on Mar. 27, 2007.

(51) Int. Cl.
*G02B 6/10* (2006.01)
(52) U.S. Cl.
USPC .......................................... 385/131; 385/132
(58) Field of Classification Search
USPC .................................. 385/131, 132
See application file for complete search history.

(56) References Cited

U.S. PATENT DOCUMENTS

| | | | | |
|---|---|---|---|---|
| 5,674,636 A * | 10/1997 | Dodabalapur et al. | ........ | 428/690 |
| 6,807,353 B1 * | 10/2004 | Fleming et al. | ............... | 385/132 |
| 7,239,786 B2 * | 7/2007 | Lo et al. | ......................... | 385/131 |
| 7,248,771 B2 * | 7/2007 | Schmidt et al. | ............... | 385/129 |
| 7,835,602 B2 * | 11/2010 | Tan et al. | ......................... | 385/14 |

OTHER PUBLICATIONS

Laurent-Lund et. al., "PECVD grown multiple core planar waveguides with extremely low interface reflections and losses," IEEE Photonics Technology Letters, vol. 10 Issue No. 10 at 1431-1433 (Oct. 1998).

(Continued)

*Primary Examiner* — Charlie Peng
(74) *Attorney, Agent, or Firm* — Frank J. Dykas; Scott D. Swanson; Dykas & Shaver

(57) ABSTRACT

A method of forming a waveguide is disclosed, as well as the waveguide itself. A multilayer stack of light guiding layers is formed, and the multilayer stack is delaminated between light guiding layers to form a waveguide between the light guiding layers. The multilayer stack is delaminated in a patterned region between light guiding layers. Here a new approach is described, wherein hollow microchannels forming a Bragg waveguide assembly are fabricated by controlled formation of thin film delamination buckles within a multilayer stack. A hollow waveguide is formed by alternating layers of the multilayer stack forming light guiding surfaces. The hollow waveguide is formed between layers that delaminate from each other, as for example under applied stress to one or more of the layers. The multi-layer stack may be formed of alternating layers of low and high index of refraction materials, as for example forming omni-directional dielectric reflectors. Metal cladding of the waveguiding layers is also provided in one embodiment, as for example by providing a metal base layer and a cap layer. Methods of assembly are disclosed, as well as the assemblies themselves.

24 Claims, 22 Drawing Sheets

OTHER PUBLICATIONS

Dumais et. al., "Silica-on-silicon optical sensor based on integrated waveguides and microchannels," IEEE Photonics Technology Letters, vol. 17 Issue No. 2 at 441-443 (Feb. 2005).

E. Epp, N. Ponnampalam, W. Newman, B. Drobot, J. N. McMullin, A. F. Meldrum, and R. G. DeCorby, "Hollow Bragg waveguides fabricated by controlled buckling of Si/SiO2 multilayers," Opt. Express 18, 24917-24925 (2010), http://www.opticsinfobase.org/abstract.cfm?URI=oe-18-24-24917.

R. G. DeCorby, N. Ponnampalam, H. T. Nguyen, M. M. Pai, and T. J. Clement, "Guided self-assembly of integrated hollow Bragg waveguides," Opt. Express 15, 3902-3915 (2007), http://www.opticsinfobase.org/abstract.cfm? URI=oe-15-7-3902.

N. Ponnampalam and R. G. DeCorby, "Self-assembled hollow waveguides with hybrid metal-dielectric Bragg claddings," Opt. Express 15, 12595-12604 (2007), http://www.opticsinfobase.org/abstract.cfm?URI=oe-15-20-12595.

T. W. Allen, J. Silverstone, N. Ponnampalam, T. Olsen, A. Meldrum, and R. G. DeCorby, "High-finesse cavities fabricated by buckling self-assembly of a-Si/SiO2 multilayers," Opt. Express 19, 18903-18909 (2011), http://www.opticsinfobase.org/oe/abstract.cfm?URI=oe-19-20-18903.

S.-S. Lo, M.-S. Wang, and C.-C. Chen, "Semiconductor hollow optical waveguides formed by omni-directional reflectors," Opt. Express 12, 6589-6593 (2004).

F. Koyama, T. Miura, and Y. Sakurai, "Tunable hollow waveguides and their applications for photonic integrated circuits," Electron. Commun. Jpn, 29, 9-19 (2006).

H. Schmidt, Y. Dongliang, J. P. Barber, and A. R. Hawkins, "Hollow-core waveguides and 2-D waveguide arrays for integrated optics of gases and liquids," IEEE J. Sel. Top. Quantum Electron. 11, 519-527 (2005).

G. R. Hadley, J. G. Fleming, S.-Y. Lin, "Bragg fiber design for linear polarization," Opt. Lett. 29, 809-811 (2004).

T. Miura, F. Koyama, and A. Matsutani, "Novel phase-tunable three-dimensional hollow waveguides with variable air core," IEEE Photonics Technology Letters, vol. 15, No. 9 at 1240-1242 (Sep. 2003).

B. Audoly, "Stability of straight delamination blisters," Phys. Rev. Lett. 83, 4124-4127 (1999).

P. Yeh and A. Yariv, "Bragg reflection waveguides," Opt. Comm. 19, 427-430 (1976).

Y. Fink, J. N. Winn, S. Fan, C. Chen, J. Michel, J. D. Joannopoulos, E. L. Thomas, "A dielectric omnidirectional reflector," Science 282, 1679-1682 (1998).

B. Temelkuran, S. D. Hart, G. Benoit, J. D. Joannopoulos, Y. Fink, "Wavelength-scalable hollow optical fibres with large photonic bandgaps for CO2 laser transmission," Nature 420, 650-653 (2002).

P. J. Joseph, H. A. Kelleher, S. A. B. Allen, and P. A. Kohl, "Improved fabrication of micro air-channels by incorporation of a structural barrier," J. Micromech. Microeng. 15(1), 35-42 (2005).

J. P. Jayachandran, H.A. Reed, H. Zhen, L. F. Rhodes, C. L. Henderson, S. A. B. Allen, and P. A. Kohl, "Air-channel fabrication for microelectromechanical systems via sacrificial photosensitive polycarbonates," Journal of Microelectromechanical Systems, vol. 12, No. 2 at 147-159 (Apr. 2003).

M.W. Moon et al., "Buckle delamination on patterned substrates", Acta Materiala, vol. 52, No. 10, 3151-3159 (2004).

M.W. Moon et al., "Directed assembly of fluidic networks by buckle delamination of films on patterned substrates", International Journal of Materials Research, vol. 98, No. 12, pp. 1203-1208 (2007).

\* cited by examiner

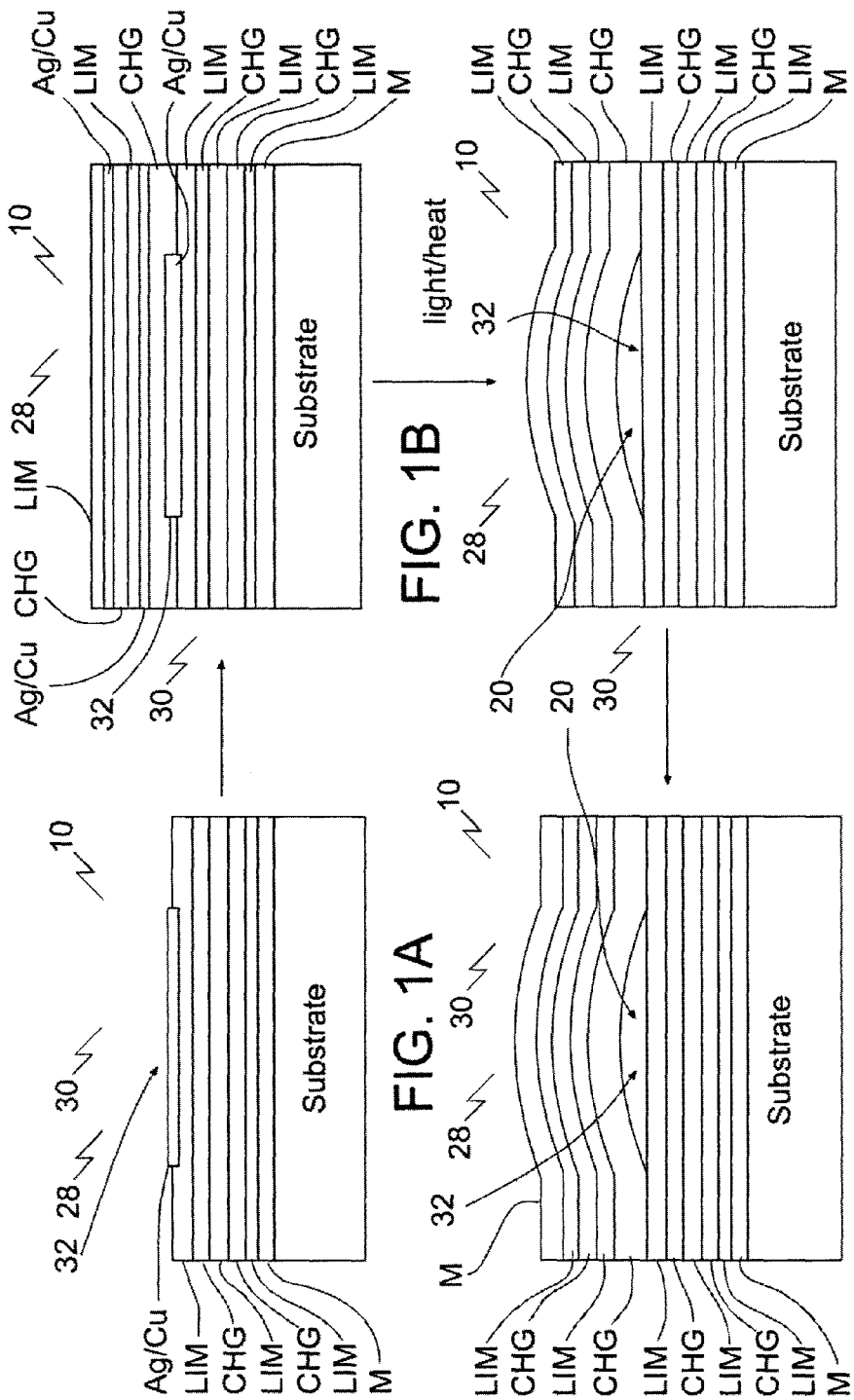

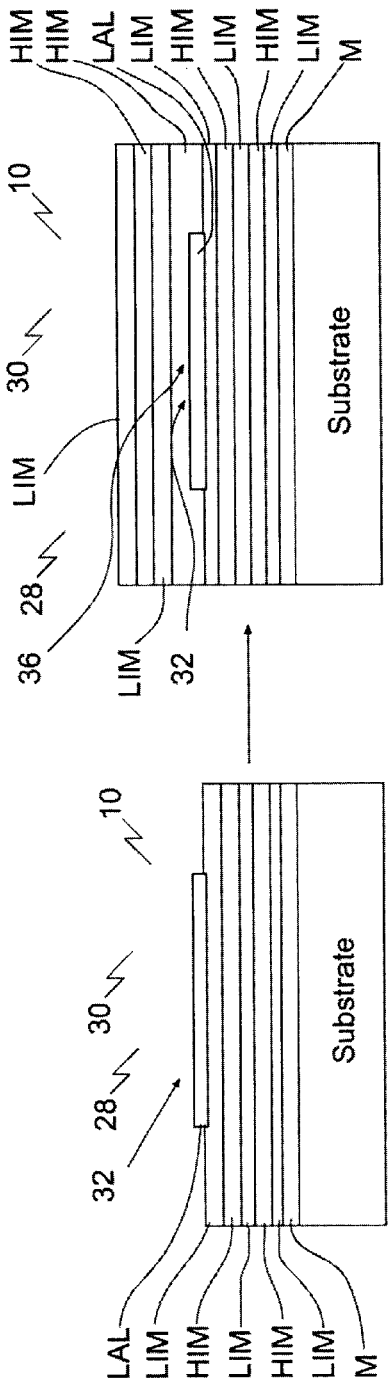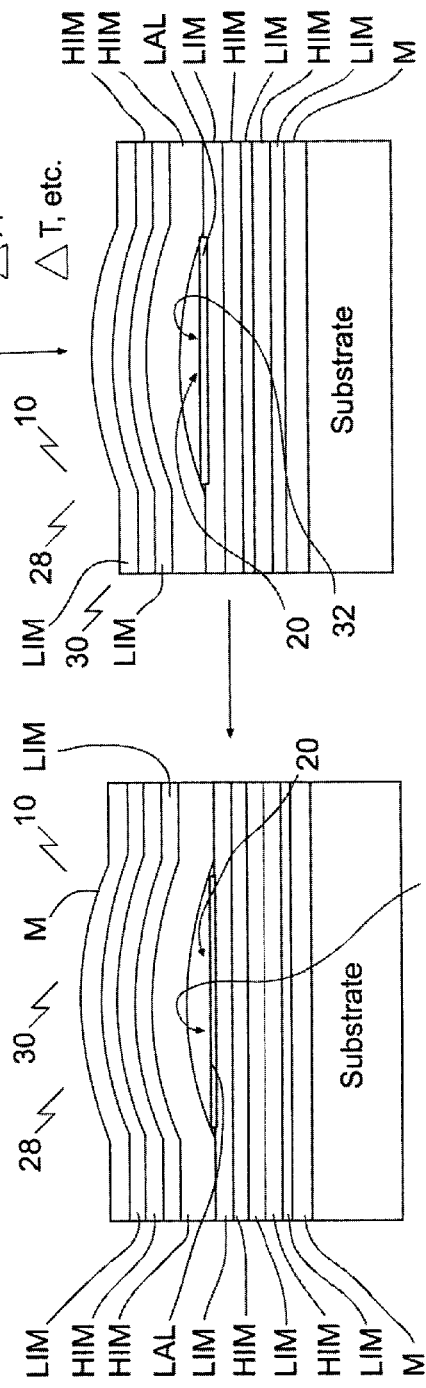

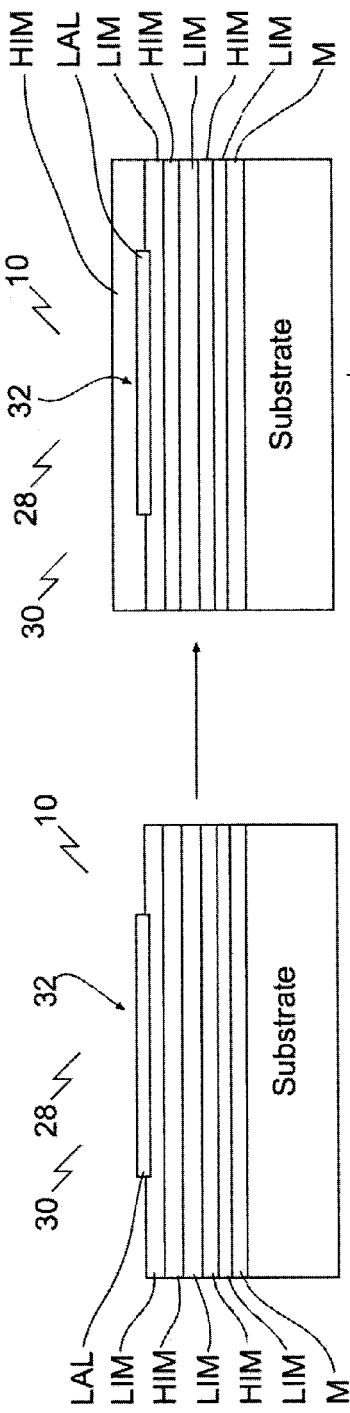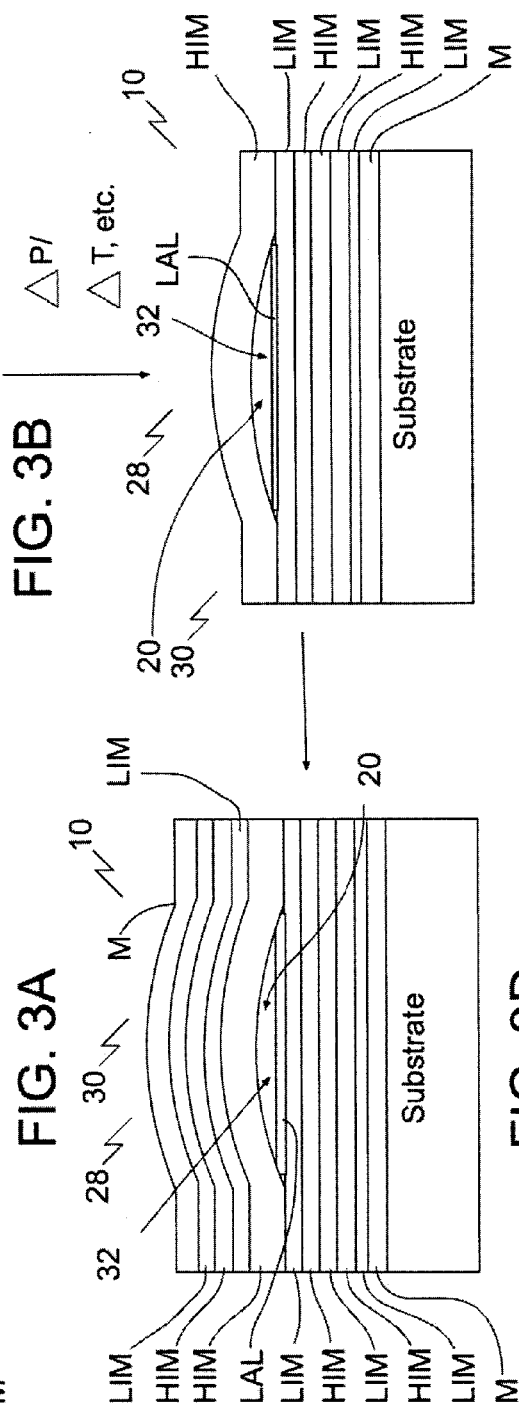

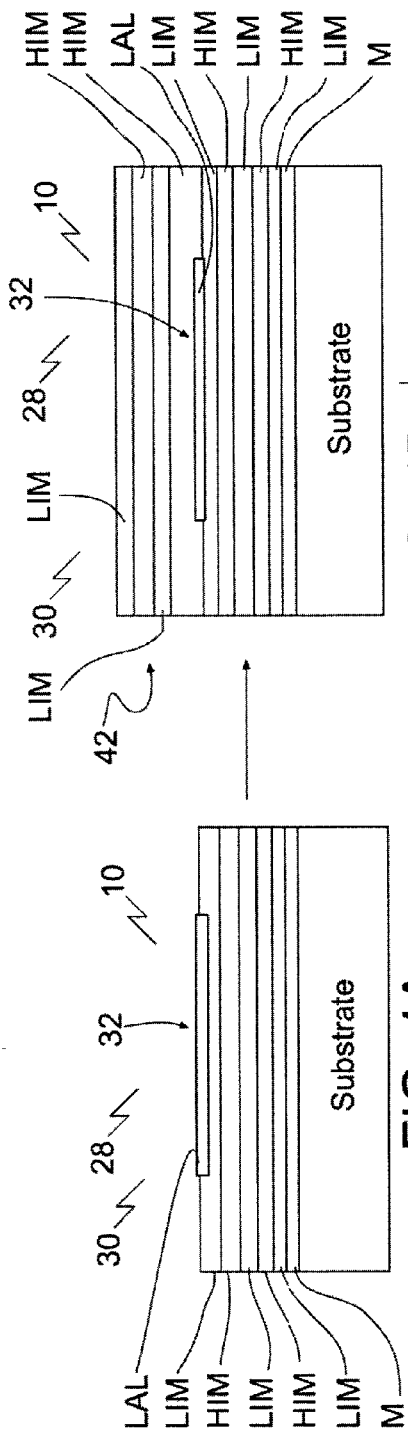
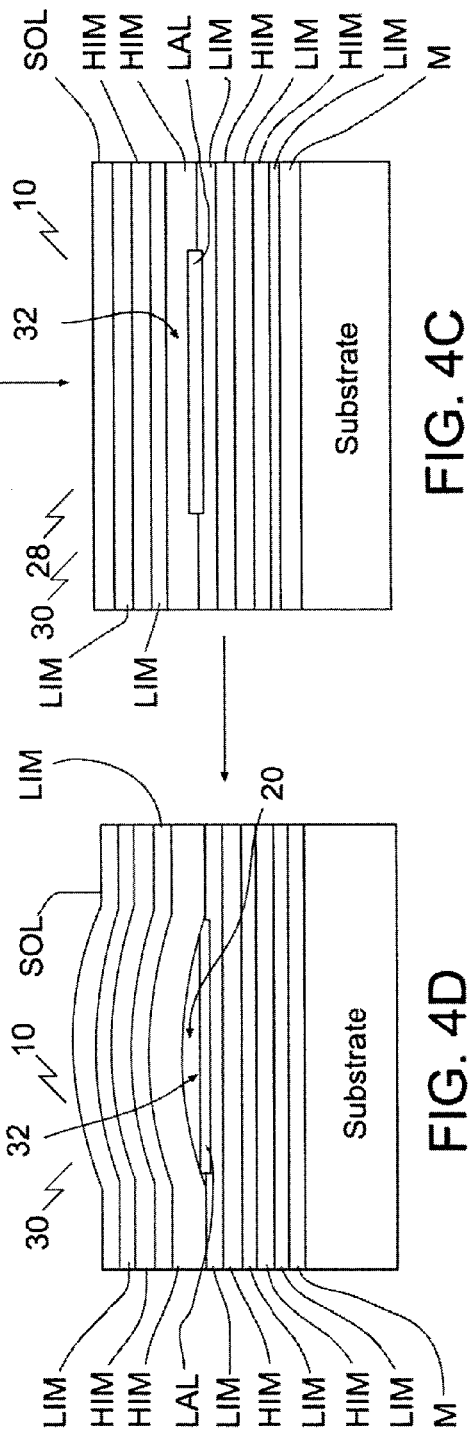

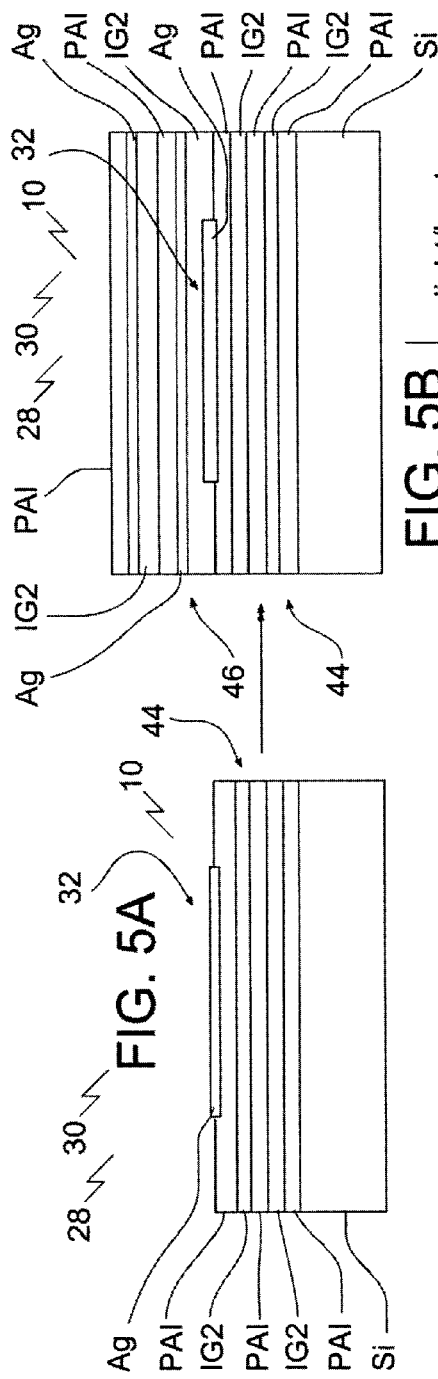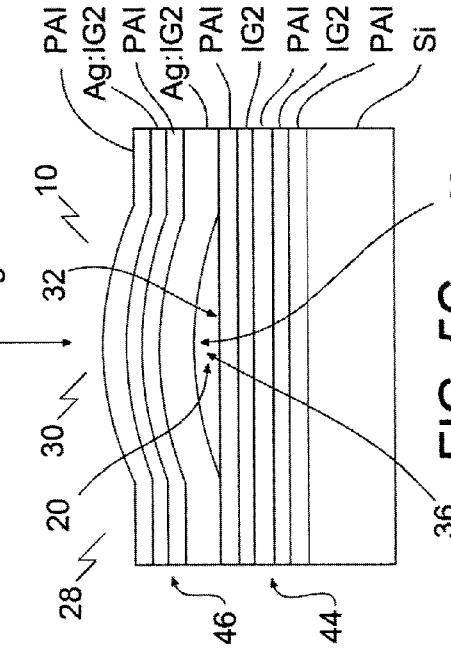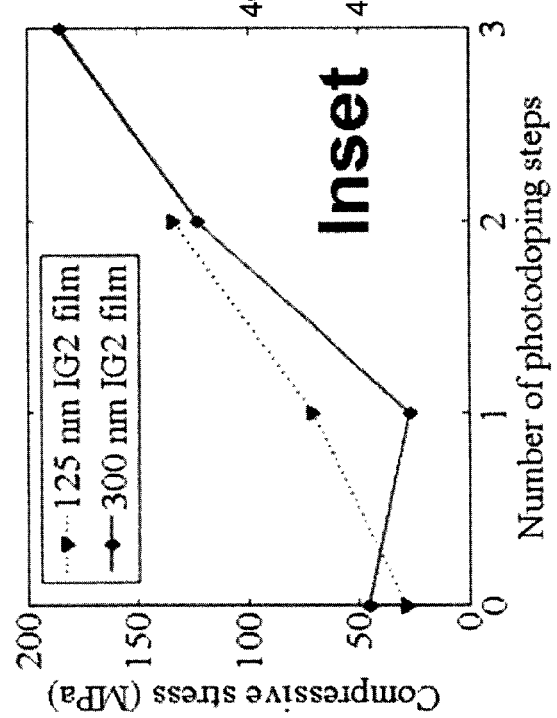

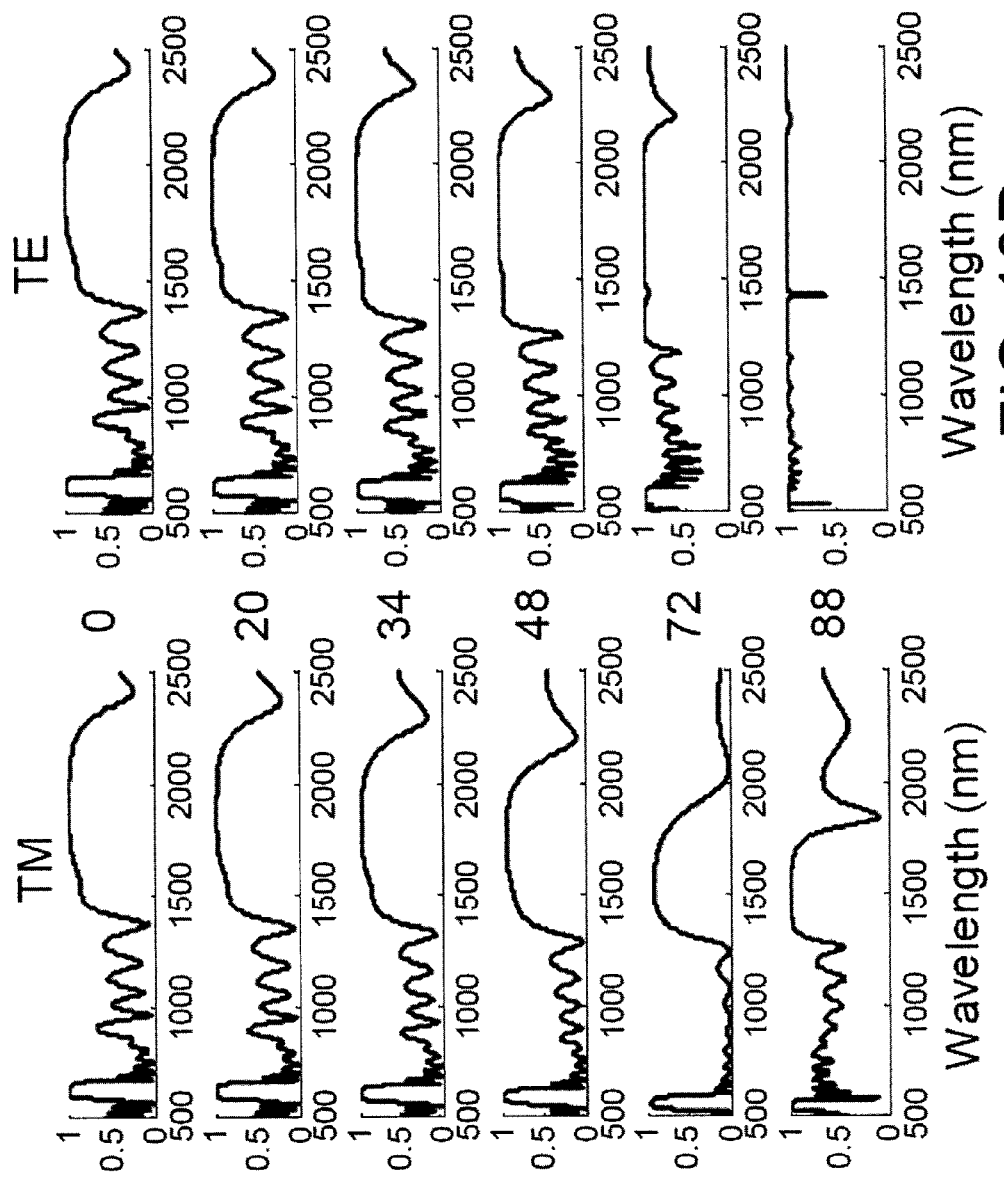

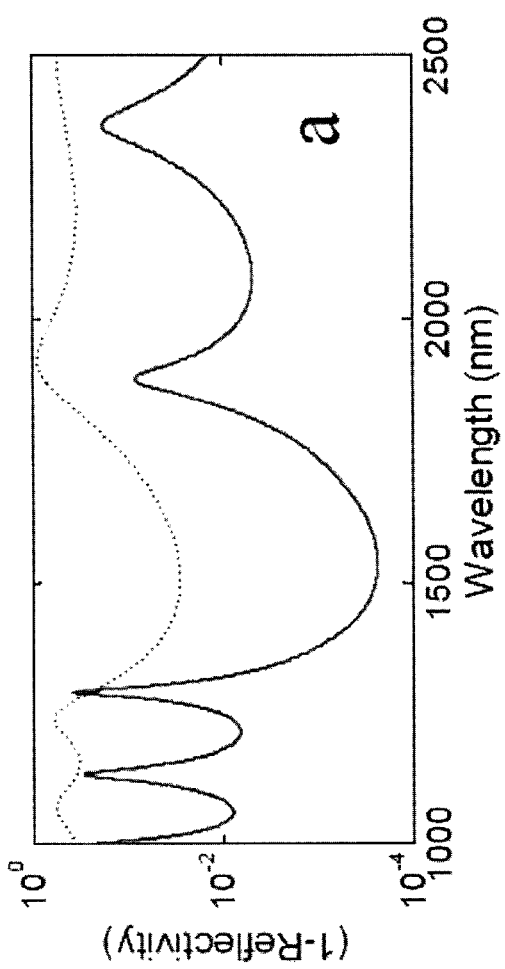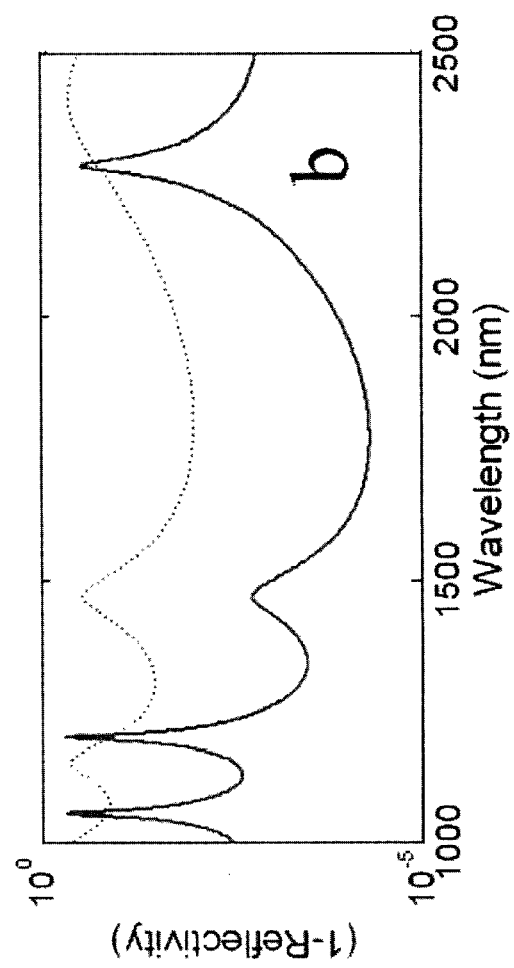
FIG. 15A
FIG. 15B

CHANNEL ASSEMBLIES

TECHNICAL FIELD

This application relates to channel assemblies, including waveguides, as well as methods of forming waveguides and microchannel assemblies.

BACKGROUND

Low-loss hollow waveguides with periodic claddings, in both fiber and integrated form, are emerging as an important class of optical devices. Potential applications include temperature-insensitive and tunable telecommunication devices, optical analysis of small volumes of gases or liquids, nonlinear optics in gases, novel slow light and opto-mechanical structures, and chip-scale optical interconnects. Integrated hollow waveguides have traditionally been fabricated by wafer bonding or by selective etching of a sacrificial material.

SUMMARY

A method of forming a waveguide is disclosed. A multilayer stack of light guiding layers is formed, and the multilayer stack is delaminated between at least two of the light guiding layers to form a waveguide between the light guiding layers.

A waveguide is also disclosed, comprising a multilayer stack of light guiding layers. The multilayer stack is delaminated in a patterned region between light guiding layers.

A waveguide is further disclosed, comprising a multilayer stack of light guiding layers. The multilayer stack has a patterned separation between at least a first waveguiding layer and a second waveguiding layer. The waveguide also comprises a reflective overlayer on the multilayer stack, and a reflective underlayer beneath the multilayer stack.

A tapered waveguide is also disclosed, comprising a multilayer stack of light guiding layers. The multilayer stack has a patterned separation between at least a first waveguiding layer and a second waveguiding layer. The patterned separation has converging sides in at least a first direction, and diminishing height in the first direction.

A method of forming a channel is also disclosed. A metal layer is deposited on a substrate. An overlayer is deposited onto the substrate over the metal layer. The metal layer is induced to diffuse into the overlayer to form a region of reduced adhesion between the substrate and the overlayer. The overlayer is delaminated from the substrate in the region of reduced adhesion to form the channel between the overlayer and the substrate.

Another method of forming a channel is disclosed. A multilayer stack of layers is formed with at least two adjacent layers having a patterned region between them. The adhesion between these adjacent layers is lower in the patterned region, compared to the adhesion between these same adjacent layers outside the patterned region. The multilayer stack is delaminated between these adjacent layers at the locations defined by the patterned region to form the channel embedded within the layers.

Here a new approach is described, wherein hollow microchannels forming a Bragg waveguide assembly are fabricated by controlled formation of thin film delamination buckles within a multilayer stack. A hollow waveguide is formed by alternating layers of the multilayer stack forming light guiding surfaces. The hollow waveguide is formed between layers that delaminate from each other, as for example under applied stress to one or more of the layers. The multi-layer stack may be formed of alternating layers of low and high index of refraction materials, as for example forming omni-directional dielectric reflectors. Metal cladding of the waveguiding layers is also provided in one embodiment, as for example by providing a metal base layer and a cap layer. Methods of assembly are disclosed, as well as the assemblies themselves.

In any of the methods and apparatus' disclosed herein the waveguide may be, for example, a Bragg waveguide, or an anti-resonant reflection waveguide, and furthermore may be tapered along the direction of the waveguide axis.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIGS. 1A-1D. The sequence of steps is shown for producing a buckled hollow waveguide with metal layers terminating the upper and lower cladding mirrors. The end view of a waveguide facet is shown in these illustrations. CHG is any chalcogenide glass that exhibits the Ag or Cu photodoping effect, LIM is a compatible low-index material such as an organic polymer, an $SiO_2$-based glass, or a hybrid of those, and M is a reflective metal (or combination of metals).

FIGS. 2A-2D. Schematic of a process used to form hollow waveguides by buckling delamination of a thin film mirror stack. The multilayer mirrors comprise high and low index silicon-based materials. LIM is the low index material, HIM is the high index material, LAL is a low adhesion layer, and M is a reflective metal or metals (optional). $\Delta P$ is a change in ambient pressure (such as occurs when removing a sample from the deposition chamber) and $\Delta T$ is a change in temperature (either incidental or applied). In some cases, LIM and HIM layers can be interchanged.

FIGS. 3A-3D. Schematic of a process used to form hollow waveguides by buckling delamination of a single layer, followed by deposition of a multilayer. The multilayer mirrors are comprised of high and low index, silicon-based materials. LIM is the low index material, HIM is the high index material, LAL is a low adhesion layer, and M is a reflective metal or metals (optional). $\Delta P$ is a change in ambient pressure (such as occurs when removing a sample from the deposition chamber) and $\Delta T$ is a change in temperature (either incidental or applied).

FIGS. 4A-4D. Schematic of a process used to form hollow waveguides by buckling delamination of a thin film mirror stack. The multilayer mirrors are comprised of high and low index, silicon-based materials. LIM is the low index material, HIM is the high index material, LAL is a low adhesion layer, and M is a reflective metal or metals (optional). SOL is a compressively stressed overlayer, consisting of, for example, one or more carbon or metal sub-layers designed for high compressive stress and high reflectivity at the wavelength of interest.

FIGS. 5A-5D. Schematic of an embodiment of a process used to form hollow waveguides. PAI is polyamide-imide and IG2 is $Ge_{33}As_{12}Se_{55}$ glass. FIG. 5D: evolution of the compressive stress in a single IG2 layer on a silicon substrate versus the number of Ag layers (~0.25 nm thick) sequentially photodoped into the glass. The origin of the horizontal axis corresponds to the as-deposited film.

In FIG. 6A, the distance between sets of 5 is roughly 1 cm. (B)-(E) Illustration of optical microscope photographs of various features: (B) 500 µm diameter rings 26, (C) 20 and 40 µm straight-sided guides, with buckled alignment mark features (crosses and squares) in between, (D) s-bends in 40 µm wide guides, and (E) sections of two adjacent tapers (centre-to-centre spacing 250 mm).

FIGS. 10A-10D. Simulated reflectivity for various incidence angles (from normal) for (a) and (b) the bottom ODR (with IG2 and PAI layer thickness 145 nm and 290 nm, respectively) and (c) and (d) the Ag-doped top ODR (with Ag:IG2 and PAI layer thickness 150 and 290 nm, respectively, except for a 260 nm thick Ag:IG2 first layer). The mirrors were designed to provide overlapping omnidirectional stop bands near 1600 nm.

FIGS. 15A-15B. Plots of 1-R for the mirrors from FIG. 14, without (dotted line) and with (solid line) terminating Au layer. (a) TM polarized light at 88 degrees from normal incidence, (b) TE polarized light at 72 degrees from normal incidence.

DETAILED DESCRIPTION

Figure 7A:
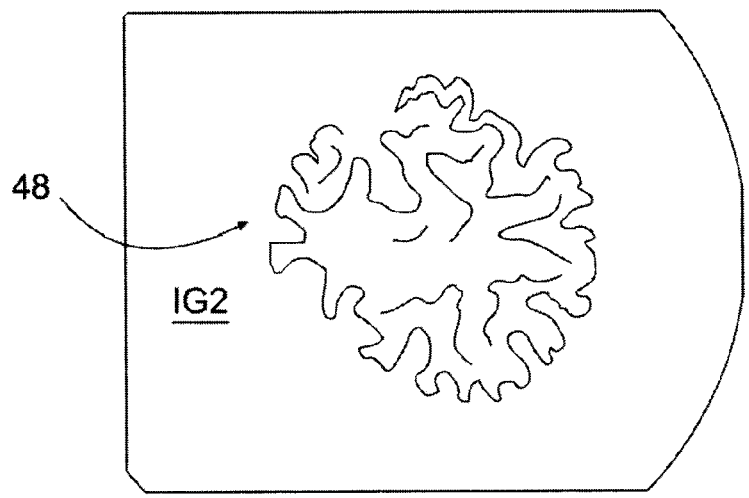
FIGS. 7A and 7B. Illustrations of buckling delamination of a single IG2 film. (a) Buckling atop a 1 mm diameter Ag circle. Real-time evolution of the buckling pattern occurs as light induces photodoping of the underlying Ag into the IG2 film (and thus loss of adhesion of the IG2 film). Outside the Ag circle, the IG2 film remains well adhered to the polymer underlayer. (b) Buckling in a region where the Ag underlayer is continuous.
Figure 7B:
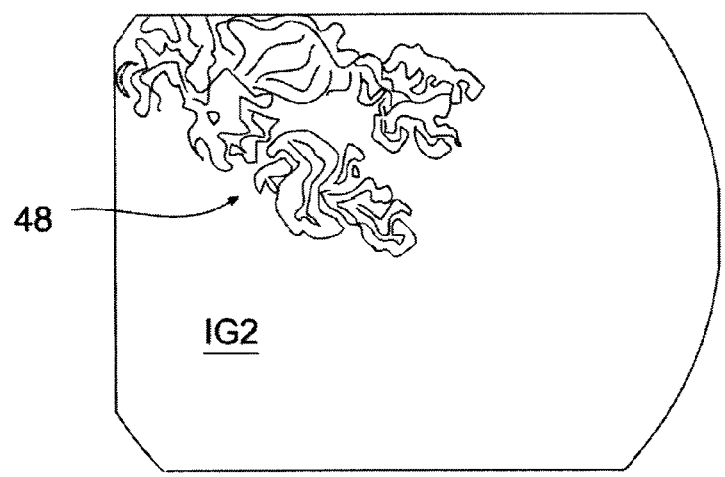
Figures 8A, 8B:
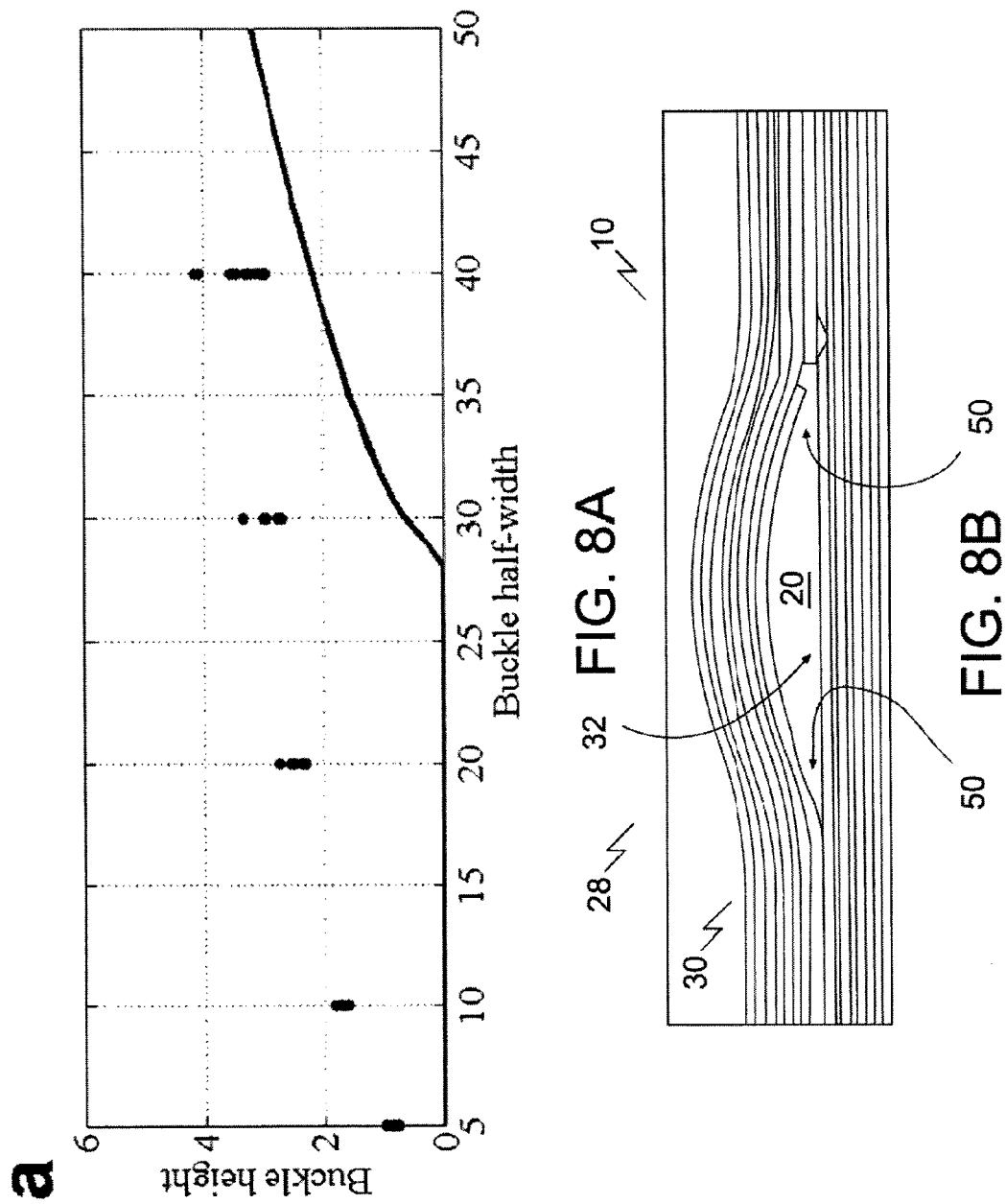
FIGS. 8A and 8B. Analysis of the buckling process for the 4.5 period upper mirror. (a) Peak buckle height versus half-width (both in units of µm) according to elastic buckling theory (solid line). After photodoping and at ~160° C., the bottom and remaining IG2 layers of the upper mirror were assumed to possess 200 and 100 MPa compressive stress, respectively (see FIG. 5D). Stress in the PAI layers was assumed negligible. The markers show some experimentally measured buckle heights for each of the nominal half-widths studied. (b) Illustration of a SEM image of a nominally 10 µm wide buckle, showing sharp bending and some cracking near the buckle peripheries.

Listing of Reference Signs
CHG—chalcogenide glass
LIM—relatively low refractive index material
HIM—relatively high refractive index material
M—metal
Ag/Cu—Silver or Copper
LAL—low adhesion layer
SOL—stressed overlayer
Ag—Silver
PAI—polyamide-imide
IG2—$Ge_{33}As_{12}Se_{55}$ chalcogenide glass
Si—Silicon
Ag:IG2—Silver-doped IG2
Au—Gold
10—waveguide
12—waveguide axis
20—waveguide gap
Substrate—any suitable substrate, for example Si.
22—microchannels
24—cross
26—circle
28—multilayer stack
30—light guiding layers
32—patterned region
34—converging sides
36—region of reduced adhesion 37—first direction
38—sinusoidal s-bends
40—square
42—overlayer film
44—first ODR
46—second ODR
48—patterned Ag layer in FIGS. 7A and 7B
50—edges of the buckle in FIG. 8B
52—flat bottomed mirror
54—upper mirror
56—sidewalls
58—low loss band Immaterial modifications may be made to the embodiments described here without departing from what is covered by the claims.

Buckling delamination of thin films is a fairly well understood phenomenon in itself. Within the regime of elastic deformation, the buckled areas are characterized by an increase in bending strain energy but a decrease in compressive strain energy. Buckling of a film can occur spontaneously, provided: (i) the compressive energy exceeds the bending energy for a given buckled width, and (ii) the energy release rate (per unit area under the buckle) is higher than the adhesion energy per unit area between the film (or stack of films) and its substrate. Various patterns may be constructed. Since film delamination causes catastrophic failure of microelectronic circuits or of protective barrier coatings, buckling has traditionally been studied as a problem to be avoided.

Referring to FIGS. 1A-1D, desired buckle morphology for microfluidic channels and hollow waveguides is a straight-sided blister, commonly known as the Euler column. Within elastic limits, and for a given equi-biaxial, pre-buckle stress level, the Euler column arises for only a restricted range of buckle width. However, if compressive, bending, or shear stresses exceed the yield stresses of the films undergoing delamination, plastic deformation also plays a role in determining the buckle shape.

To control the location and shape of delamination buckles, two distinct properties may be engineered. First, a technique for creating regions of low and high adhesion is required. Second, some means is required for accurately controlling the stress within the layers to be buckled. One embodiment of the process is guided self-assembly of straight-sided, Euler-like buckles by delamination of a multilayer stack 28, as illustrated in FIGS. 1-5.

A method of forming a waveguide 10, and waveguide 10 itself is disclosed. Referring to FIG. 6E, the waveguide 10 may be tapered along the axis 12 of the waveguide. Referring to FIGS. 1A-1D, a multilayer stack 28 of light guiding layers 30 is formed, and the multilayer stack 28 is delaminated between at least two adjacent light guiding layers 30 to form a waveguide 10 between the light guiding layer 30. The waveguide formed may be a waveguide core embedded within the light guiding layers 30. Referring to FIG. 1D, the waveguide 10 is represented by a gap 20. In some embodiments, gap 20 may be a hollow microchannel or waveguide core. In other embodiments, gap 20 may be filled with various types of material. In some embodiments, the multilayer stack 28 is delaminated in a patterned region or separation 32 between light guiding layer 30. Referring to FIG. 1C, delamination of the multilayer stack 28 may occur along patterned region 32 between light guiding layer 30. Referring to FIG. 6E, the patterned region 32 may have converging sides 34, and thus in some embodiments, the waveguide 10 is tapered in both width and height along the waveguide axis. Referring to FIG. 2B, in some embodiments, the patterned region 32 is defined by a region of reduced adhesion 36 between light guiding layer 30. The region of reduced adhesion 36 may be characterized by a low-adhesion layer (LAL).

Referring to FIG. 1C, in other embodiments, the multilayer stack 28 may have a patterned separation or delamination between at least a first waveguiding layer and a second waveguiding layer. In the embodiment illustrated in FIG. 1C, the first and second waveguiding layers include the LIM and CHG layers that define gap 20. Each or both of the first and second waveguiding layers may consist of multiple individual layers. The multilayer stack 28 may be delaminated at the patterned separation. Referring to FIG. 6E, the patterned separation may have converging sides 34 in at least a first direction 37, and diminishing height in the first direction.

Referring to FIG. 5B, the patterned region 32 may correspond to a region of metal to be subsequently doped into one or more of the light guiding layer 30s. In the embodiment of FIG. 5B, the metal to be subsequently doped into the light guiding layer 30 is illustrated as Ag. Referring to FIG. 4B, the patterned region 32 may also correspond to a region of surface coating on one or more of the light guiding layer 30. The surface coating may comprise, for example, one or more of the materials listed in Table 3. In the embodiment of FIG. 4B, the surface coating is illustrated by the LAL layer.

The assembly technique is generally applicable to any material system, and may involve:

Referring to FIG. 1A, a thermodynamically compatible pair of materials, one with relatively low refractive index (LIM) and the other with relatively high refractive index (HIM). Ideally, the refractive index contrast between the materials should be sufficiently high as to enable an omnidirectional dielectric reflector (ODR).

An ability to tailor the compressive stress of either one or both of the materials above, and/or to augment their stress through the addition of a compressively stressed overlayer. By varying the deposition parameters, the magnitude of compressive stress for many standard thin film dielectrics can be controlled with high accuracy. Referring to FIG. 4C, many metal and carbon-based films exhibit extremely high compressive stress using standard deposition techniques, and can be used as stressed overlayers (SOL).

Some means to create localized (patterned) regions 32 of reduced adhesion at one interface within the multilayer. Various techniques may be used for modifying the adhesion energy of various materials, especially those used in silicon-based micro-electromechanical (MEMs) systems.

Self-assembled hollow Bragg waveguides may be made using standard silicon materials (Si, $SiO_2$, $SiN_x$, and/or amorphous metal-oxides), which find uses in electronics and MEMs industries. In the embodiments illustrated in FIGS. 1-4, the reference sign "substrate" is used to illustrate the substrate used. It should be understood that the substrate may be, for example, any of the above-listed silicon materials, or any other suitable substrate. The materials are suited for controlling the stress of thin films, such as by varying deposition parameters, and for modifying the adhesion of such materials. Therefore, all of the requirements listed above can be met.

Referring to FIGS. 3A-3D, a waveguide 10 is illustrated, comprising light guiding layer 30. In some embodiments, the light guiding layer 30 may comprise alternating layers of different index of refraction. The alternating layers may comprise a first material having a relatively low index of refraction and a second material having a relatively high index of refraction. The first material may comprise, for example, silicon dioxide or an organic polymer. Referring to FIGS. 5A-5C, an example of the first material is illustrated as polyamide-imide (PAI). In addition, the second material may comprise, for example, one or more of chalcogenide glass CHG, amorphous silicon, polycrystalline silicon, silicon nitride and an amorphous metal oxide. Referring to FIGS. 1A-1D, chalcogenide glass (CHG) is illustrated. In some embodiments, light guiding layer 30 may form omni-directional dielectric reflectors. Referring to FIG. 3D, in other embodiments, the multilayer stack 28 further comprises at least one of a reflective overlayer and a reflective underlayer. Referring to FIG. 3D, in some embodiments a reflective metal layer (illustrated in FIG. 3D by the reference numeral M) is applied to at least one of below and above multilayer stack 28, or to both below and above multilayer stack 28. In further embodiments, the multilayer stack 28 comprises both a reflective overlayer and a reflective underlayer. The reflective overlayer may be on the multilayer stack 28, while the reflective underlayer may be beneath the multilayer stack 28, as illustrated in FIG. 3D by the reference numeral M. The overlayer and/or the underlayer may each comprise, for example, one or more metal films, such as, for further example, nickel, stainless steel or tungsten. The films may be reflective metal films. In some embodiments, gap 20 may be formed by inserting a shaped sacrificial layer in the patterned separation 32 during formation of the multilayer stack 28. Subsequent removal of the sacrificial material may then complete the formation of gap 20. Embodiments such as these may be carried out, for example, in cases where a metal overlayer and a metal underlayer are present.

$SiO_2$ (with for example n~1.45-1.5) may, for example, be used as the LIM layer, particularly in applications using air incidence due to a near optimal refractive index in such applications. For the high index layers, amorphous silicon, polycrystalline silicon, silicon nitride, or one of various amorphous metal-oxides, including $Ta_2O_5$, $TiO_2$, $HfO_2$, $Nb_2O_5$, $Y_2O_3$, and $ZrO_2$ may be used. Thus, numerous silicon-based material combinations are available for fabrication of Bragg filters and ODRs, satisfying the first requirement.

The stress of a thin film material used in one of the layers can be tuned over a wide range (from compressive to tensile) by varying one or more deposition parameters, or in some cases by appropriate post-deposition annealing. This knowledge enables Bragg mirrors and ODRs to be deposited with accurately controlled stress distribution, satisfying the second requirement for the guided self-assembly of hollow waveguides 10 by buckling delamination.

Referring to FIG. 4B, waveguide 10 may have, for example, a thin film between the multilayer stack 28 and the reflective overlayer. In the embodiment illustrated in FIG. 4B, the thin film is represented by the LAL layer. Referring to FIG. 3D, the overlayer and/or the underlayer may comprise a noble metal layer, illustrated for example as M.

Table 1 below shows representative stress tunability for various Si, nitride, and oxide-based films reported in the literature. As is standard, compressive stress is assigned a negative value and tensile stress a positive value.

| Thin film material | Deposition technique | Variables use to control stress | Stress range [MPa] |
|---|---|---|---|
| a-Si: H | PECVD (150° C.) | Film thickness | −370 to −130 |
| $SiN_x$ | PECVD | Temp., gas flow | −600 to +500 |
| $SiN_x$ | PECVD | Temp. | −600 to +300 |
| $SiO_2$ | sputtering | pressure | −270 to −150 |
| $TiO_2$ | Ion beam | Substrate temp. | −242 to −37 |
| $TiO_2$ | sputtering | pressure | −900 to −250 |
| $Nb_2O_5$ | sputtering | Bias voltage | −1000 to +100 |

-continued

| Thin film material | Deposition technique | Variables use to control stress | Stress range [MPa] |
|---|---|---|---|
| $Nb_2O_5$ | Ion beam | Bias voltage | −470 to −370 |
| $Ta_2O_5$ | Ion beam | Bias voltage | −560 to −380 |
| $ZrO_2$ | e-beam evap. | Temp./rate | −150 to +200 |

The intrinsic stress of $SiO_2$ films (deposited by sputtering or physical vapor deposition, etc.) is almost invariably compressive, and many high index materials such as those described above tend also to exhibit compressive stress. Furthermore, the compressive stress of most of these materials can be tuned by controlling one or more deposition parameters (substrate temperature, chamber pressure, etc.), as summarized in Table 1. This list is representative, but far from exhaustive. The stress of most films, regardless of deposition technique, can be varied through control of the deposition parameters. Other film properties, such as optical loss and refractive index, also tend to vary with deposition parameters.

Many films exhibit extremely high intrinsic compressive stress, including diamond-like carbon (DLC) and metals such as nickel (Ni), stainless steel (SS), and tungsten (W). Such films may be used as highly stressed overlayers to induce buckling delamination of an underlying film.

Hybrid metal-dielectric mirrors can be used to produce very low loss hollow integrated waveguides 10. This has created the possibility of exploiting both the high reflectivity (to reduce radiation loss) and the compressive stress (to assist in buckle formation) of a suitable metal (or metals in a bilayer structure, etc.). Some metal films that exhibit high compressive stress (under appropriate conditions of deposition) are listed in Table 2.

TABLE 2

Some compressively stressed metal films that might be used as stressed overlayers (SOL) in the buckling delamination of hybrid metal-dielectric mirrors.

| Material | underlayer | Deposition technique | Compressive stress [GPa] |
|---|---|---|---|
| Nickel | polycarbonate | sputtering | 1.5 |
| Stainless steel | polycarbonate | sputtering | 1-2 |
| tungsten | $SiO_2$/Si | sputtering | 2-2.5 |

Adhesion is one of the tribological properties of a film material (the others are friction and wear). Various methods for reducing the adhesion of Si, $SiO_2$, and $SiN_x$ surfaces, may be used as for example by addition of an ultrathin coating film (illustrated for example in FIG. 4B as the LAL surface) or by chemical modification of the material surface (the distinction is somewhat arbitrary, based mainly on the technique used to deposit the surface layer). In some embodiments, the region of reduced adhesion may be created by applying a surface coating to one or more of the light guiding layer 30. As previously mentioned, an example of a surface coating is illustrated by the LAL layer in FIG. 4C. The surface coating may comprise, for example, one or more of the materials listed in Table 3. For example, hard inorganic films may be used as low adhesion surfaces, including diamond-like carbon (DLC), titanium nitride, titanium carbide, and silicon carbide. Also, many hydrocarbon and fluorocarbon films (such as Teflon) exhibit low adhesion and may also be used. Organic self-assembled monolayers (SAMs) may also be used as a means for chemically modifying the adhesion of silicon-based films. Some surfaces of interest and corresponding low adhesion layer (LAL) surface coatings are summarized in Table 3.

If these LALs are to be used, a few practical requirements must be satisfied. First, if the LAL is to remain on the inner surface of the hollow waveguide 10 (ie. as a surface layer on the upper or lower cladding mirror), it ideally should be optically transparent in the wavelength range of interest, have low roughness, and have thickness much less than the wavelength of interest. Most of the LALs listed in Table 3 should meet these requirements. The LAL should also survive subsequent deposition of the upper Bragg mirror/ODR. Many of the LAL films/SAMs in Table 3 can survive to high temperature. This enables the processing temperature to be varied in accordance with optimizing the stress, mechanical properties, and optical properties of the upper mirror.

Referring to FIG. 4B, in one embodiment of the method, the region of reduced adhesion may be created by modifying the adhesion energy of one or more of the light guiding layers 30, as illustrated by the LAL layer. Referring to FIGS. 5B-5C, in addition, the region of reduced adhesion may be created by induced diffusion of an embedded metal layer (illustrated as Ag) into one or more of the light guiding layer 30.

TABLE 3

Some low adhesion layers (LALs) for standard silicon-based materials. Layer thicknesses are typical, but are not necessarily limited to the value shown.

| Material (surface) | Low adhesion layer (LAL) | LAL deposition technique | LAL thickness [nm] |
|---|---|---|---|
| silicon | Perfluoropolyether | Dip-coating | <10 |
| polysilicon | fluoroalkysilane | CVD | ~1 |
| Silicon | Various organic SAMs | Vapor phase | ~2 |
| $SiO_2$ | Dodecyltrichlorosilane | Dip-coating | 1.5 |
| silicon | Organosilane (SAMs) | Vapor phase | ~1 |
| silicon | TiC | Pulsed laser dep. | <100 nm |
| silicon | DLC | Plasma CVD | >25 nm |
| silicon | SiC | LPCVD | ~1000 |

Referring to FIGS. 1B-1C, delaminating the multilayer stack 28 may comprise applying a stress to one or more of the light guiding layer 30. The stress may be applied by, for example, a spontaneous release of pre-stressed light guiding layers. The pre-stressed light guiding layers may be intrinsically pre-stressed light guiding layers. In some embodiments, this stress may be intrinsic to the film deposition process, for example, and may lead to spontaneous release of pre-stressed light guiding layer 30. In addition, the stress to drive delamination may be applied by heating of the multilayer stack 28, cooling of the multilayer stack 28, or changing pressure (illustrated in FIGS. 2B-2C) applied to the multilayer stack 28. The stress may be compressive, for example. The stress may be applied by one or more of the above mentioned techniques.

Given the ability to control the stress and adhesion, various process flows can be used to fabricate hollow Bragg waveguides by buckling delamination of standard silicon electronics materials. Three alternative exemplary process flows (methods) are described in the following sub-sections.

Method 1—Multilayer Buckling Driven by Intrinsic Stress of Dielectric Layers

In the first method, the intrinsic compressive stress (arising from film deposition) is the main driver used to induce buckling delamination of a Bragg mirror or ODR. Referring to FIG. 2A, a low adhesion layer (LAL) is patterned using standard lithographic techniques (etching or liftoff) at a selected interface within the overall multilayer. The process is illustrated schematically in FIGS. 2A-2D.

A detailed description of the process steps for method 1 is as follows:

M1.1 Referring to FIG. 2A, deposit a Bragg mirror or ODR onto a substrate (illustrated as substrate in FIG. 2A) of choice, to act as the lower cladding of the hollow waveguides 10. The stress of the layers in this lower mirror is relatively arbitrary (provided it is not so high as to cause mirror failure), so that the layer depositions should be optimized to ensure maximum reflectivity of the Bragg stack at the wavelength of interest. A highly reflective metal layer (or layers of metal, optimized for adhesion and reflectivity) may be deposited prior to the dielectric mirror, to reduce the radiation loss of waveguide modes. The metal layer is illustrated in FIGS. 2A-2D as the layer M. The final (upper) dielectric layer in this mirror can be either the LIM or the HIM, depending on the layers chosen in the subsequent steps.

M1.2 Referring to FIG. 2A, deposit and pattern a low adhesion layer (LALs), selected to ensure preferential delamination between the upper and lower mirrors at the locations of the LAL. While FIG. 2D shows the LAL remaining adhered to the bottom mirror after buckling, it might also be designed to adhere to the upper mirror.

M1.3 Referring to FIG. 2B, deposit a Bragg mirror or ODR to act as the upper cladding of the hollow waveguides 10. The first (lowest) layer in this mirror can be either the LIM or the HIM, depending on the layers (LAL, etc.) chosen in the other steps. Within this mirror, the intrinsic stress is determined by the choice of deposition parameters. The stress resultant for the upper mirror is tuned to a suitable compressive value, such that straight-sided delamination buckles can form spontaneously (or after subsequent thermal treatment or other processing, as illustrated in FIG. 2C) over the patterned LAL strips from the previous steps.

M1.4 If buckles do not form spontaneously after the step in M1.3, the driving force for delamination can be temporarily increased. For example, depending on the thermal expansion coefficients of the mirror materials relative to that of the substrate, either cooling or heating the sample will increase the compressive stress resultant in the upper mirror.

M1.5 Referring to FIG. 2D, after buckling, a reflective metal overlayer (illustrated as layer M) can be deposited to reduce the radiation loss of modes guided in the hollow core.

Method 2—Buckling of a Single Layer Followed by Deposition of Low-Stress Layers

Referring to FIGS. 3A-3C, another approach for fabricating a hollow Bragg waveguide 10 is to buckle a single, compressively stressed film lying atop a patterned LAL. Referring to FIG. 3D, this can be followed by the deposition of low-stress HIM, LIM, and metal layers to reduce the radiation loss of guided modes to the value desired. An advantage of this approach is that it can produce hollow cores of smaller dimensions, since the dimensions of straight-sided buckles scale with the thickness of the film (or stack of films) undergoing the buckling delamination. The process steps for Method 2 are shown schematically in FIGS. 3A-3D.

A detailed description of the processing steps for Method 2 is as follows:

M2.1 According to a method similar to that used in Method 1 as described in paragraphs M1.1-M1.2.

According to a method similar to that used in Method 1.

M2.2 Referring to FIG. 3B, deposit a compressively stressed thin film, either HIM or LIM. This film acts as the first (lowest) layer in the upper cladding mirror of the hollow waveguides 10. Stress of this film is determined by the choice of deposition parameters. It is tuned to a suitable compressive value, such that straight-sided delamination buckles form spontaneously (or after subsequent thermal treatment or other processing as illustrated in FIG. 3C) over the patterned LAL strips from the previous steps.

M2.3 If buckles do not form spontaneously after the step in M2.2, the driving force for delamination can be temporarily increased. For example, depending on the thermal expansion coefficient of the compressively stressed layer described in M2.2 relative to that of the substrate, either cooling or heating the sample will increase the compressive stress of the layer from the step in in M2.2.

M2.4 Referring to FIG. 3D, after buckling, alternating LIM/HIM layers and a reflective metal overlayer M can be deposited to reduce the radiation loss of modes guided in the hollow core. The stress of these layers is tuned to a sufficiently low value that the buckles formed in previous steps remain stable.

Method 3—multilayer buckling driven in part by a compressively stressed overlayer.

Referring to FIGS. 4C-4D, in this embodiment, delaminating the multilayer stack 28 may comprise applying a compressively stressed overlayer (SOL) to the multilayer stack 28. The compressively stressed overlayer SOL may be, for example, a carbon-based or metallic layer. In addition, the compressively stressed overlayer SOL may comprise one or more carbon or metal films, such as, for example, nickel, stainless steel or tungsten.

Highly stressed overlayers can be used to drive the buckling delamination of underlying thin films. Thus, a third method for fabricating integrated hollow Bragg waveguides 10 is as shown in FIGS. 4A-4D.

A detailed description of the processing steps for Method 3 is as follows:

M3.1 According to a method similar to that used in Method 1 as described in paragraphs M1.1-M1.2.

According to a method similar to that used in Method 1.
According to a method similar to that used in Method 2.

Referring to FIG. 4B, deposit a metallic overlayer film 42, to increase the compressive stress of the upper mirror and drive buckling delamination over the LAL strips. The metallic overlayer can consist of one or more metal sub-layers. Referring to FIG. 4C, in addition, adhering the compressively stressed overlayer SOL to the multilayer stack 28 may be accomplished with a thin film, for example, a thin layer such as Ti or Cr (not shown) might be used to ensure strong adhesion of the metallic overlayer to the upper dielectric mirror. Furthermore, this might be followed by a noble metal (not shown) with high reflectivity at the wavelength of interest (typically in the visible to near infrared). Finally, as illustrated in FIGS. 4C-4D, a highly stressed metallic layer (illustrated as the SOL layer) may be added to cause the spontaneous formation of buckles over the LAL strips. In some embodiments, the compressively stressed overlayer is not metallic. After delaminating the multilayer stack 28 between light guiding layer 30, additional light guiding layer 30 may be deposited on the multilayer stack 28.

To illustrate the feasibility of our proposed methods, we consider a specific example based on the buckling of a 3 period $Si/SiO_2$ multilayer with or without a stressed tungsten (referred to in this description as W) overlayer. If terminated by a reflective metal and designed for use in the 1550 nm wavelength region (where both Si and $SiO_2$ have good transparency), such a mirror has potential for reflectivity R>0.999. For the analysis of buckling, the mechanical properties of the thin film materials were assumed as listed in Table 4.

TABLE 4

Mechanical properties used in the elastic buckling analysis of a multilayer.

| material | layer thickness [nm] | Young's modulus [GPa] | Poisson's ratio | intrinsic stress [MPa] |
|---|---|---|---|---|
| polysilicon | 110 | 150 | 0.22 | −300 |
| $SiO_2$ | 260 | 70 | 0.17 | −200 |
| W | varied | 410 | 0.28 | −2000 |

Buckling of a multilayer stack 28 with or without a stressed overlayer (as per the schemes shown in FIGS. 2A-2D and 4A-4D, respectively) may be analyzed using a mathematical treatment that assumes a purely elastic buckling response. A plot may be derived of the energy release late (for propagation of a straight-sided Euler buckle) and the peak buckle height, both versus the buckle half-width (ie. the half-width of the LAL strip defined in FIGS. 2A-2D and 4A-4D). For a straight-sided buckle formed by spontaneous delamination of a 3 period $Si/SiO_2$ multilayer, with a 200 nm thick W overlayer, and for a given set of intrinsic stresses, buckling is found to be only energetically favorable above some critical half width. Furthermore, for buckling to occur spontaneously the energy release rate must exceed the effective adhesion energy of the LAL interface. The addition of the W overlayer does not significantly affect the critical buckling half-width (it is actually slightly lower without the W layer), because the W layer adds both compressive stress and significant stiffness to the multilayer (W has a high elastic modulus). Rather, the main role of the W overlayer is to increase the driving force for delamination (ie. the energy release rate), so that buckling can occur spontaneously. This driving force increases with the W layer thickness, which can be adjusted once the effective adhesion energy of the LAL is known.

Straight-sided Euler buckles are predicted for delamination half-widths in the 20 to 50 μm range (approximately). Therefore, hollow waveguides 10 may be realized based on the buckling of a $Si/SiO_2$ multilayer. Due to the similar intrinsic stresses and elastic moduli of all the materials in Table 1, this conclusion can be extended to multilayers combining any one of the other high index materials with $SiO_2$.

Figure 6A:
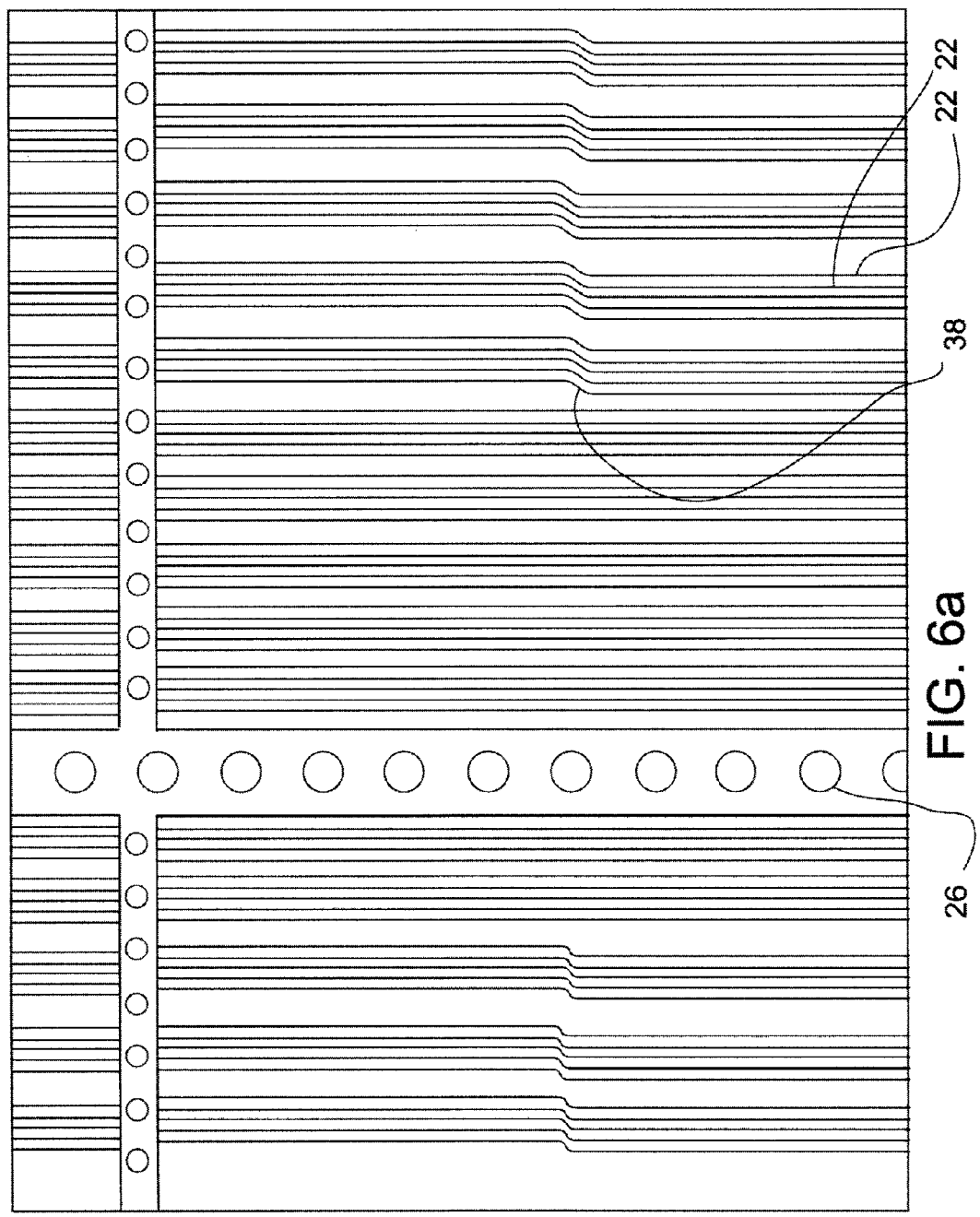
FIGS. 6A-6E. Illustrations of images taken of a chip after the buckling process. The features illustrated are representative examples of the types of structures that can be formed in a single parallel process. (A) Illustration of a low magnification photograph showing straight-sided buckles. Although not visible in the illustration, the microchannels 22 may have nominal widths from 10 to 80 µm (shown in groups of 5), and 80 to 20 µm and 80 to 10 µm tapers. Sinusoidal s-bends 38, and rings 26 with diameters of 500 and 1000 µm are illustrated.
Figure 6B:
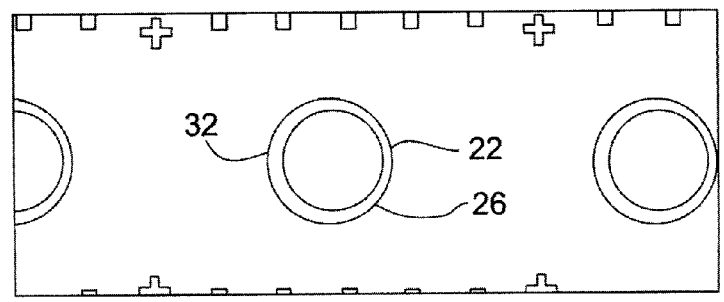
Figures 6C, 6D:
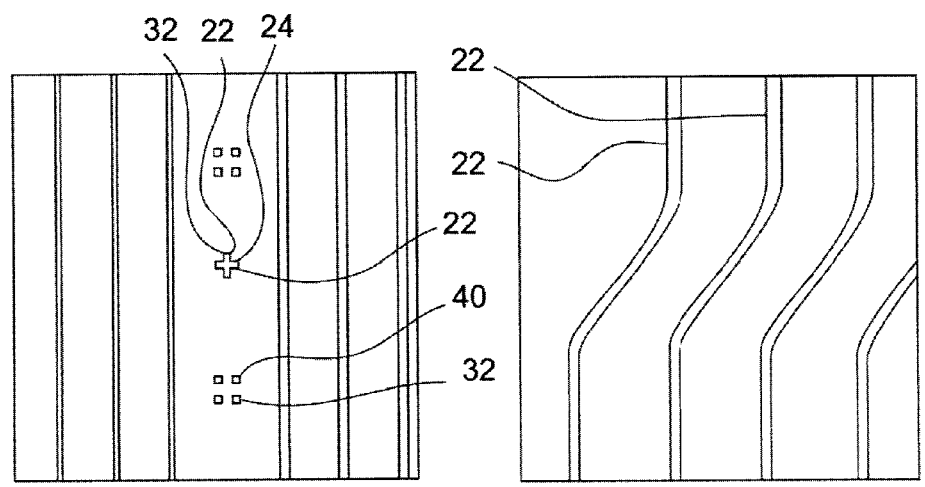
Figure 6E:
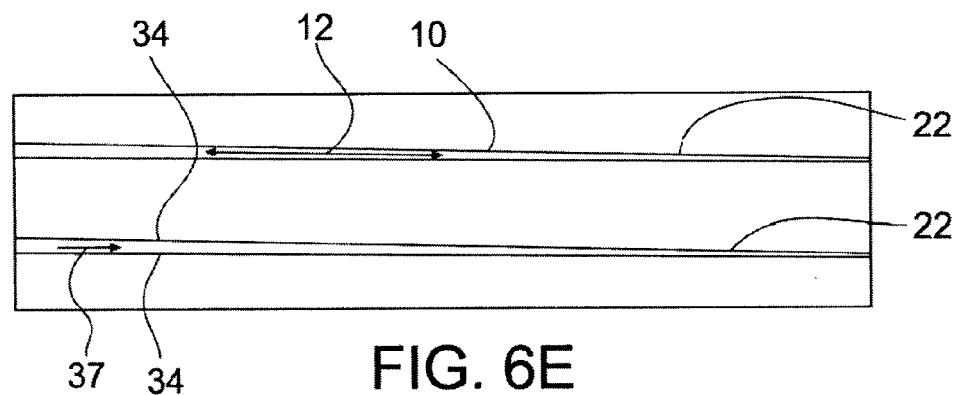

Referring to FIGS. 5A-5D and FIGS. 6A-6F, in another embodiment, microchannels 22 may be made within omnidirectional dielectric reflector (ODR) claddings comprising thin films of chalcogenide glass and polymer. Straight, curved, tapered and crossing channels 22 may be realized on a single wafer. The microchannels 22 may be formed by, for example, using the processes illustrated in FIGS. 1-5, and FIG. 16. Referring to FIG. 6A, sinusoidal s-bends 38 are illustrated, along with circles 26. As illustrated in FIG. 6C, the patterned region 32 may be, for example, in the shape of cross 24, such that intersecting waveguide microchannels 22 are formed. Referring to FIG. 6C, the patterned region 32 may also be in the shape of a rectangle or square 40. Referring to FIG. 6B, the patterned region 32 may be, for example, a circle 26, such that a dome or ring shaped waveguide microchannel 22 is formed.

The region of reduced adhesion may be created by modifying the adhesion energy of one or more of the light guiding layer 30. Referring to FIGS. 5B-5C, the region of reduced adhesion may also be created by induced diffusion of an embedded metal layer (illustrated as the Ag layer) into one or more of the light guiding layer 30. Control over both adhesion energy and compressive stress may for example be achieved through silver photodoping of chalcogenide glass layers.

Photodoping is a well-known phenomenon, where illumination of a silver film in contact with a chalcogenide glass causes the silver to be dissolved into the glass. We can tune the compressive stress in a chalcogenide glass film by photodoping varying amounts of silver, as shown in the inset of FIGS. 5A-5C. Under the right conditions (as described below), dissolution of an embedded Ag layer results in loss of adhesion between the adjacent chalcogenide film and an underlying polymer layer.

A representative process flow (FIGS. 5A-5C) is described briefly in the following, although various techniques of film deposition may be used. Referring to FIG. 5A, in one example, a series of alternating $Ge_{33}As_{12}Se_{55}$ chalcogenide glass (illustrated as IG2) (Vitron AG) and polyamide-imide (PAI) polymer (Torlon AI-10, Solvay Advanced Polymers) layers (~150 nm and 290 nm thick, respectively) were deposited, starting and ending with a polymer layer, to form an 8.5 period first ODR 44. Referring to FIG. 5A, a thin silver layer (~50 nm thick) illustrated as Ag was patterned by liftoff on the top surface of this mirror. Referring to FIG. 5B, a second (4.5 period) ODR 46 was then deposited, starting with a thicker (~260 nm) IG2 glass layer (first layer only). In this ODR 46, a thin (~20 nm) silver layer (Ag) was deposited following each IG2 glass layer. Referring to FIG. 5C, aside from tuning the stress, dissolved Ag increases the thickness and refractive index of the IG2 layers, thereby increasing the peak reflectivity and omnidirectional bandwidth of the upper ODR, and forming Ag:IG2 layers. Referring to FIGS. 5B-5C, the PAI layers in the upper mirror were soft-baked only (5 min at 90° C.). As is typical for spun cast and cured polymer films, the PAI layers are under tensile stress at room temperature (in the 10-20 MPa range, as determined by studying single PAI layers). The tensile stress of these layers offsets the compressive stress in the IG2 layers, and inhibits the buckling of the stack 28 during its deposition.

Following deposition of the entire structure, the sample appeared essentially flat and featureless. A two-step process may be used to initiate post-deposition buckling as described in the example following. Referring to FIGS. 5B-5C, first, the sample was exposed to a high intensity (~0.1 W/cm$^2$) white light source for approximately 1 day, to drive dissolution of Ag into the IG2 glass films to form the Ag:IG2 layers illustrated in FIG. 5C. Second, the sample was heated on a hot plate in a flowing nitrogen atmosphere. Any previously undissolved Ag diffuses into adjacent IG2 films during this baking process, increasing the stress of the IG2 layers in the upper mirror. In a typical baking process, empirically optimized by testing numerous samples, the temperature was ramped at ~5° C./min up to 120° C., and then at ~1° C./min until nearly all of the intended features had buckled. While we often observed some localized buckling after the white light exposure, most of the buckling features arise above some critical temperature (~160° C.) during the baking process. As the temperature rises, the compressive stress of all layers increases (in addition to the stress increase caused by Ag dissolution) due to the higher thermal expansion coefficients of IG2 (~12×10$^{-6}$ K$^{-1}$) and PAI (~30×10$^{-6}$ K$^{-1}$) relative to the Si substrate (~3×10$^{-6}$ K$^{-1}$). Furthermore, the layers are more prone to deform plastically at elevated temperature, as discussed below. Referring to FIG. 5C, the end result is that the upper ODR 46 buckles in locations defined by the patterned Ag layer, producing hollow channels (similar to Euler columns) surrounded by ODR mirrors (see FIGS. 5 and 6). After buckling, the sample was slowly cooled to room temperature, and spun-cast with an overlayer of epoxy (Norland Optical Adhesive, NOA-73). Samples were cleaved after a brief immersion in liquid nitrogen, which improves the tendency of the PAI layers to fracture in a brittle manner on cleaving.

Dissolution of the Ag strips into the bottom IG2 layer of the upper mirror is believed to be akin to a 'disappearance' of the interfacial bonds in these regions. Within the upper mirror, delamination between the PAI and Ag-doped IG2 (Ag:IG2) layers is avoided by restricting the Ag thickness. Because of the order of deposition, sufficiently thin Ag layers are nearly completely dissolved into the IG2 layers during sputtering deposition (due to the kinetic energy of arriving Ag ions) or shortly afterward (due to routine light exposure), and subsequent PAI layers are found to adhere very well.

Some embodiments of this process enable the fabrication of a variety of structures on a single sample, as shown in FIGS. 6A-6E. Referring to FIG. 6A, straight-sided channels 22 of width 10 to 80 μm were realized in parallel, although the wider channels (60 and 80 μm) may exhibit some localized wrinkling along the channel (see FIGS. 9A-9B), likely due to the onset of a secondary buckling mode. The ring structures 26 shown in FIGS. 6(a) and (b) are somewhat unique, as they derive from embedded circles of Ag. These regions delaminate entirely during the baking step, forming a dome shape at high temperature. On cooling to room temperature, the centers of the domes collapse resulting in the self-assembled, ring-shaped channels shown. We have verified that these channels are hollow by cleaving through rings and inspecting their cross-section using an illustration of a SEM image. The tapered channels (FIG. 6(e)) are tapered in both width and height, as per the discussion below. Referring to FIG. 6E, the tapered channels 22 have converging sides 34 in at least the first direction 37, and diminishing height in the first direction 34. Such waveguides have been studied theoretically in the context of slow light effects and out-of-plane coupling.

To theoretically analyze the buckling of the multilayers, we used bulk material properties for $Ge_{33}As_{12}Se_{55}$ (IG2) glass and Torlon polyamide-imide (PAI) polymer. It should be noted that the elastic modulus and other mechanical properties of a thin film might be different than the bulk counterparts. Furthermore, Ag doping of the IG2 glass likely modifies its mechanical properties.

The elastic modulus, Poisson's ratio, and coefficient of thermal expansion (CTE) of IG2 glass are approximately 21.9 GPa, 0.27, and 12×10$^{-6}$ K$^{-1}$, respectively. The tensile and flexural yield strengths of IG2 glass are on the order of 20-100 MPa. The elastic modulus, Poisson's ratio, and CTE of Torlon AI-10 (an unfilled grade of Torlon) are approximately 3 GPa, 0.4, and 30×10$^{-6}$ K$^{-1}$, respectively. Its tensile and flexural strengths are on the order of ~150 MPa at room temperature and ~100 MPa at 150° C. Torlon PAI is amongst the toughest and strongest of all polymers, and exhibits exceptional retention of mechanical properties over a wide range of temperature (from cryogenic temperatures up to ~250° C.). This poses a challenge with respect to facet preparation, as mentioned above. When extensively cured, the PAI layers (such as in the lower mirror of the devices described) have a tendency to stretch and deform on cleaving (even after a bath in liquid nitrogen). Soft-baked layers are less tough and cleave more readily.

In early phases of the work, we studied the buckling delamination of single layer chalcogenide films. FIGS. 7(a) and (b) show the delamination and buckling of a single IG2 layer (~500 nm thick). The layer was deposited on top of a patterned Ag layer, the position of the Ag layer being indicated by reference sign 48 (~40 nm thick), which in turn lies atop a 500 nm PAI layer on a silicon wafer. The $Ge_{33}As_{12}Se_{55}$ layer was subsequently deposited with a second (non-patterned) Ag layer (also ~40 nm thick) and then stored in a refrigerator for several months. The sample was removed from the refrigerator, allowed to return to room temperature, and then placed under the microscope. The microscope light-source immediately induced photodoping of the Ag layers into the glass, causing loss of adhesion at the locations of the underlying Ag features. FIG. 7(a) shows a circular Ag feature, over which the IG2 film is partially delaminated. When the intensity of the microscope light is increased, Ag photodoping drives further delamination of the IG2 film and changes in the buckle patterns. Note that the delamination does not extend outside the perimeter of the underlying Ag circle. We have observed (although did not record) straight-sided Euler buckles forming overtop straight-sided Ag strips on similar samples. FIG. 7(b) shows buckling in a region where the Ag underlayer 48 is continuous. Silver photodoping might be a powerful technique for studying the dynamic properties of thin film buckle formation.

The critical (minimum) compressive stress required to elastically buckle a thin isotropic plate or film (assuming sufficiently low adhesion in the latter case) is given by the well known expression:

$$\sigma_C = \frac{\pi^2}{12} \frac{E}{1-v^2} \left(\frac{h}{b}\right)^2, \quad (1)$$

where b is the half-width of the buckle, and h, E, and u are the thickness, elastic modulus, and Poisson's ratio of the plate or film, respectively. The Euler column arises for $b_0 \leq b \leq 2.5 \ast b_0$ (approximately), where $b_0$ is the minimum half-width for buckle formation given a pre-buckle stress level $\sigma_0$. Furthermore, the Euler buckle has a raised cosine shape with peak amplitude (ie. the height of the buckle at its centre) given by $$\delta_{max} = h\sqrt{\frac{4}{3}\left(\frac{\sigma_0}{\sigma_C} - 1\right)} \quad (2)$$

Our buckling experiments on single IG2 films over pre-patterned Ag strips verified these relationships. For multilayers, buckling can be analyzed using either an effective medium approach or by considering each sub-layer individually. Based on the latter approach, and using the material parameters described above and layer thicknesses described below, predictions of the elastic buckling theory (for representative stress levels, see FIG. 5D) are plotted in FIG. 8(a) along with experimentally measured buckle heights.

The disagreement between the elastic theory and the experimental data is larger than can be explained by uncertainties in the moduli or compressive stresses of the films. Rather, it is likely due to the neglect of plastic deformation in the purely elastic theory, as follows. First, the stress levels employed are comparable to the yield stresses of both the PAI polymer and the IG2 glass (see above), particularly at elevated temperature. Second, the aspect ratio (h/b, with h the total thickness of the upper ODR) for our buckled structures is outside the 'thin plate' limits specified for application of the elastic theory. It is known that buckling of 'thick' plates is accompanied by plastic deformation, and that the corresponding critical buckling stress is well below that predicted by the purely elastic theory. The shape of the smallest buckled features (see FIG. 8(b)) supports this conclusion. The profile is not well described by a raised cosine function, and there is sharp bending (and even evidence of cracking in some cases) near the edges 50 of the buckle. Plastic deformation is somewhat beneficial in the present context, as it enables straight-sided buckles with aspect ratios that could not be produced by elastic deformation alone.

Figure 9A:
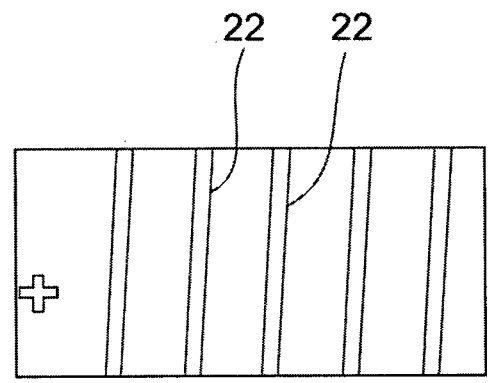
FIGS. 9A and 9B. Illustrations of microscope photographs of straight-sided buckles: (a) 60 and (b) 80 µm base width. The 60 µm features show some localized, small-scale wrinkling along the axis of the channels. The wrinkling is more extensive and significant for the 80 µm features.
Figure 9B:
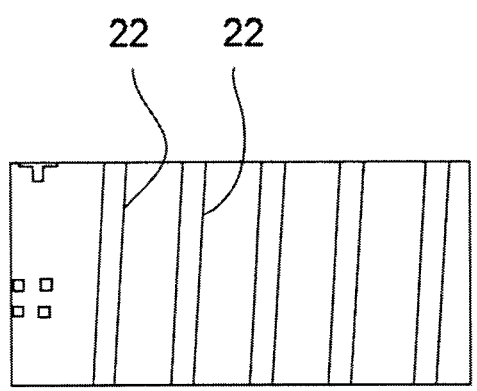
Figures 10A, 10B:
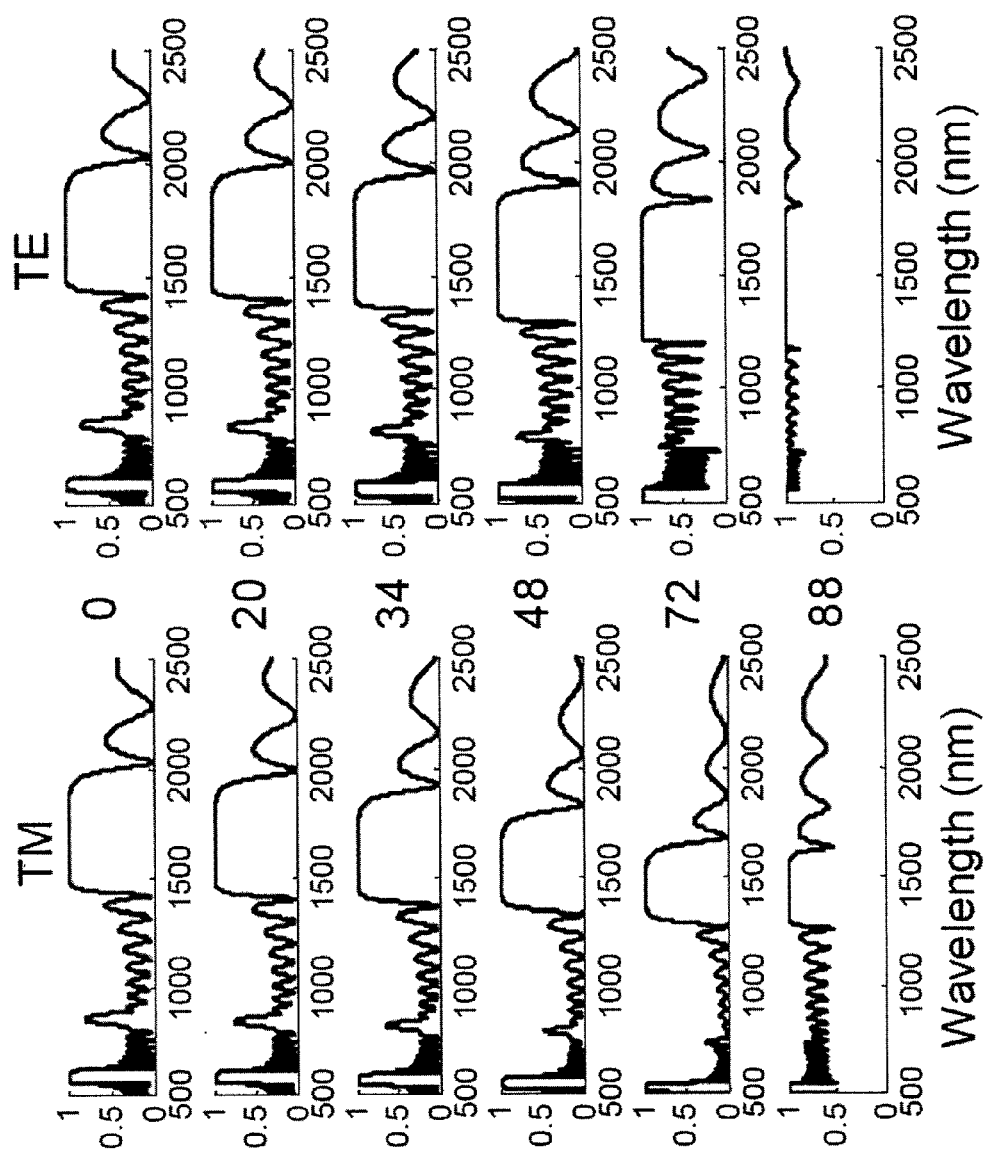

As mentioned above, for elastic buckling of a thin film (or stack of films), there is a restricted range of delamination widths that produce a straight-sided Euler buckle. This is because the initial buckling releases compressive strain in the direction normal to the buckle axis only. For sufficiently wide Euler columns, residual compressive strain along the axis causes secondary wrinkling in that direction. Even though the buckling deviates from a purely elastic process in the present case, we observed evidence for a similarly restricted range of straight-sided buckle widths. FIGS. 6B-6e show 10, 20, and 40 µm wide buckles, which were consistently straight-sided for the process described. FIGS. 9A-9B shows typical sets of 60 µm and 80 µm wide buckles (illustrated as microchannels 22) from the same process. These may exhibit regions of secondary wrinkling, and the wrinkling is most significant for the widest channels. This is likely the reason that the 40 µm wide waveguides exhibited the lowest loss (see below), in spite of the fact that the wider waveguides have larger (especially taller) hollow cores. For a given material system and layer design, there may be a restricted range of straight-sided buckle widths. Furthermore, this range can be controlled through appropriate design of the layers and their compressive stress.

Figure 11A:
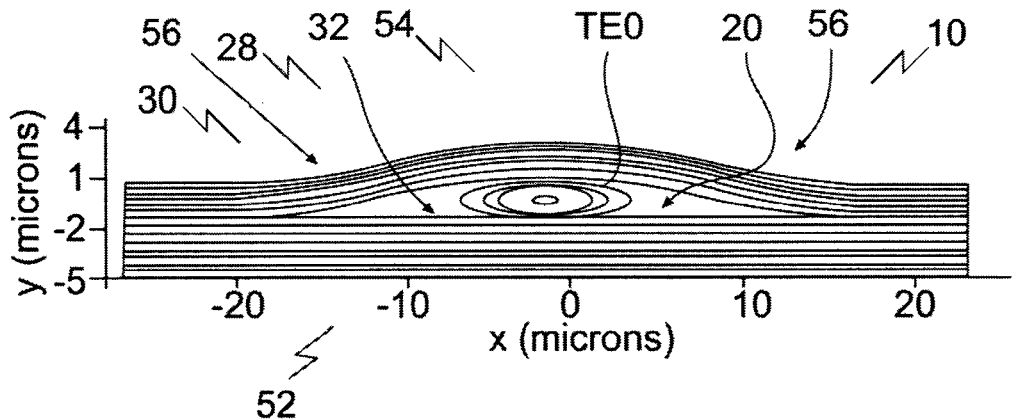
FIGS. 11A-11F. Results from a commercial finite difference mode solver. (a)-(c) The intensity distributions for the 3 lowest order TE modal solutions at 1600 nm, respectively. (d)-(e) The predicted radiation loss versus wavelength for the modes in parts (a)-(c), respectively. Results from a commercial finite difference mode solver, for a waveguide with 40 µm base width and 2.5 µm peak height FIGS. 12A-12E. Results for guidance of TE polarized light in buckled waveguides with 40 µm base width. (a)-(c) Near field mode profiles: (a) fundamental mode at 1610 nm, (b) first order mode at 1610 nm, and (c) second order mode at 1586 nm. (d) Loss estimate from plot of scattered light versus distance along a straight, 40 µm wide waveguide. To ensure a conservative estimate, data points associated with a scattering defect near 2.4 mm were removed. (e) Scattered light (1595 nm wavelength) from a nominally 40 µm wide hollow waveguide (~5 mm in length) captured by an infrared camera. The sinusoidal s-bend is 500 µm long with a 250 µm offset. Light is coupled at left and the output facet is visible at right.
Figure 11B:
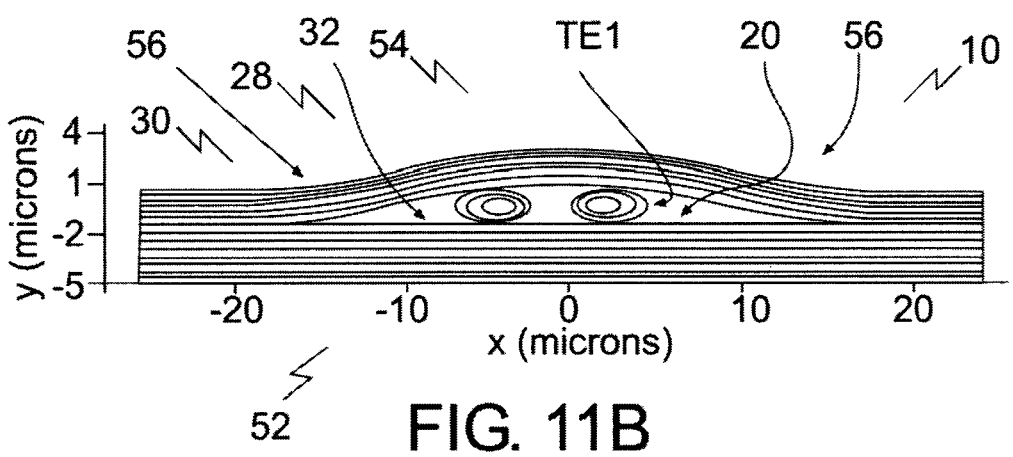
Figure 11C:
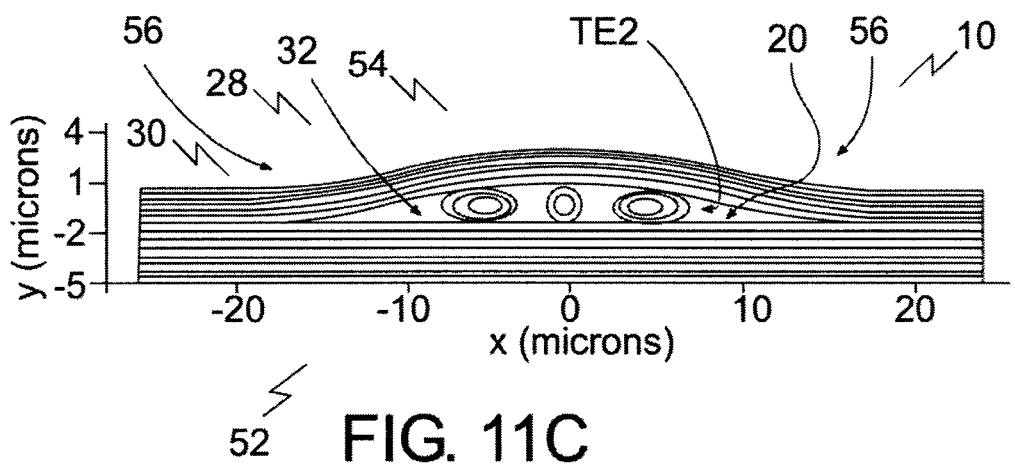

Waveguides 10 with Bragg reflector claddings (Bragg waveguides) were originally proposed 30 years ago, and have received renewed interest due to the recent discovery of ODRs. Cladding a Bragg waveguide with an omnidirectional dielectric reflector enables higher confinement of light to a hollow core, improved robustness against defect induced scattering, better fabrication tolerance, and potential for low-loss waveguide bends For Bragg waveguides with small (wavelength scale) core dimensions, low propagation loss is dependent on highly reflective cladding mirrors. Guidance of linearly polarized light is particularly challenging, due to the lower reflectivity of a Bragg mirror for TM polarized light (especially at high angles of incidence). A reduction in the polarization dependence of mirror reflectivity can be achieved by tuning the thickness of the layer nearest the air core. Referring to FIGS. 11A-11C, for in-plane polarized light guidance in the buckle waveguides, the flat bottom mirror (illustrated generally as reference sign 52) effectively sees TE polarized light. The upper (buckled) mirror (illustrated generally as reference sign 54) is curved, making it necessary to consider both polarization states. To reduce radiation loss at the 'sidewalls' 56, the first layer of the upper mirror 54 was designed to be approximately a half wavelength thick.

Given the self-assembled shape of the hollow waveguides, an accurate theoretical analysis requires a numerical solution (see below). However, because the waveguides of interest have a low height to width ratio, a simplified slab model can be expected to provide some insight. FIGS. 10A-B and 10C-D show the predicted reflectivity for the upper and lower cladding mirrors 54 and 52, respectively (in a planar model for the mirrors) at various angles of incidence and for both TE and TM polarization. The layer thicknesses were estimated from SEM images, and Ag photodoping was assumed to increase the refractive index of the IG2 layers in the upper mirror by 0.35.

Using a ray-optics model for a slab Bragg waveguide, the loss due to sub-unity mirror reflectivity is $$\alpha = 10 \log_{10}(R^M), \quad (3)$$

where α is the loss in dB/cm, R is the mirror reflectivity (assumed equal for both mirrors) at the ray's angle of incidence, and M is the number of reflections per centimeter of waveguide length. For the fundamental mode and a core size considerably larger than the wavelength of light, and neglecting penetration of light into the cladding mirrors (which is reasonable for high index contrast mirrors), it follows that $$\alpha \approx \frac{5\lambda}{D^2}\log_{10}(R), \quad (4)$$

where λ is the free-space wavelength in cm, and D is the thickness of the hollow core (ie. the mirror separation) in cm.

For the waveguides described here, the upper and lower cladding mirrors are not identical. Using the same approximations as above, the loss due to sub-unity mirror reflectivity is then $$\alpha \approx \frac{2.5\lambda}{D^2}\log_{10}(R_T R_B), \quad (5)$$

where $R_T$ and $R_B$ are the reflectivities of the top and bottom mirrors, respectively.

The 40 μm wide waveguides described below have a peak core height of ~2.5 μm. Using this as the core thickness in the slab model, the incident angle for the fundamental mode ray is ~72 degrees from normal at a wavelength of 1600 nm. From the data in FIGS. 10A-D, the relevant reflectivities for TE polarized light are $R_B$~0.999 and $R_T$~0.996. Using these numbers in (5) produces α~14 dB/cm. Note that this estimate is approximately valid for all of the low-loss TE modes discussed below, since they are single-moded in the vertical direction.

Referring to FIG. 5C, the buckled waveguides 10 have a laterally tapered shape along the direction perpendicular to the waveguide axis 12 (shown in FIG. 6E), which results in an index guiding mechanism in that direction, that is, perpendicular to the direction 37 (shown in FIG. 6E). Furthermore, the effective width of the waveguides in the lateral direction (while difficult to define exactly) is relatively large and the use of a λ/2 first layer in the upper mirror results in a reasonably high reflectivity (~0.98) for TM light at near-glancing incidence. The net result is that the radiation of TM polarized light through 'sidewalls' of the waveguide is of secondary importance. This is evinced by assuming a lateral effective core width of ~10 μm (a somewhat arbitrary but conservative value) and an effective mirror reflectivity of 0.98 in the expressions above.

Since the slab model is only a rough approximation of the actual structures (with curved upper mirrors), a more accurate numerical solution was obtained using commercial finite difference software (Mode Solutions 2.0, Lumerical Solutions Inc.). Referring to FIGS. 11A-11C, for modeling purposes, we assumed the buckles to have a raised cosine shape. From profilometer measurements, this was verified to be a good assumption for the wider (>20 μm wide) buckles. Perfectly matched layer boundary conditions were used, and the simulation grid size was varied until further reduction produced no significant changes in the modal solutions. We used the same refractive index dispersion expressions and layer thicknesses as above, and neglected material absorption. FIGS. 11A-F shows the 3 lowest-order TE mode solutions at 1600 nm wavelength for a waveguide 10 with base width 40 μm and peak height 2.5 μm, along with their predicted loss (due to radiation through the mirrors) versus wavelength. Referring to FIGS. 11A-11C, the three lowest order modes are illustrated as TE0, TE1, and TE2, respectively.

Figure 11D:
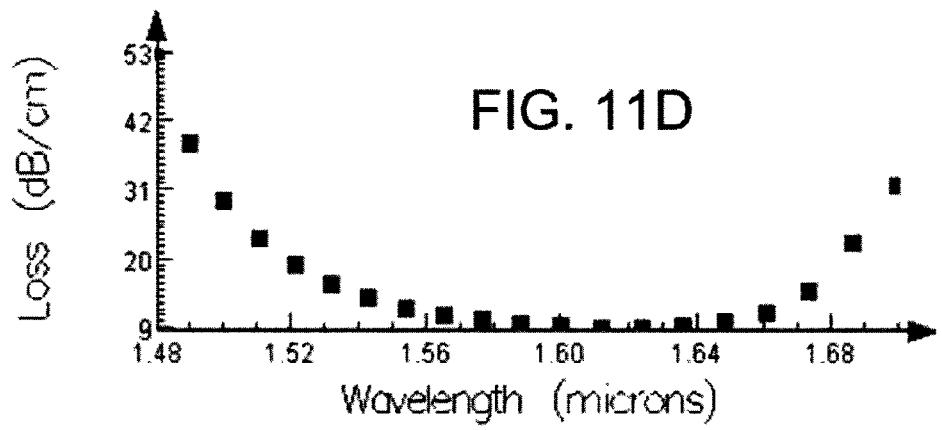
Figure 11E:
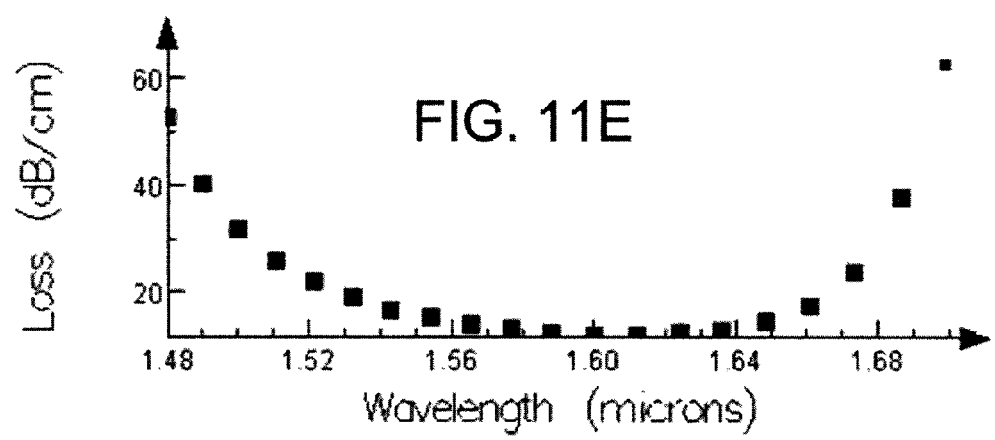
Figure 11F:
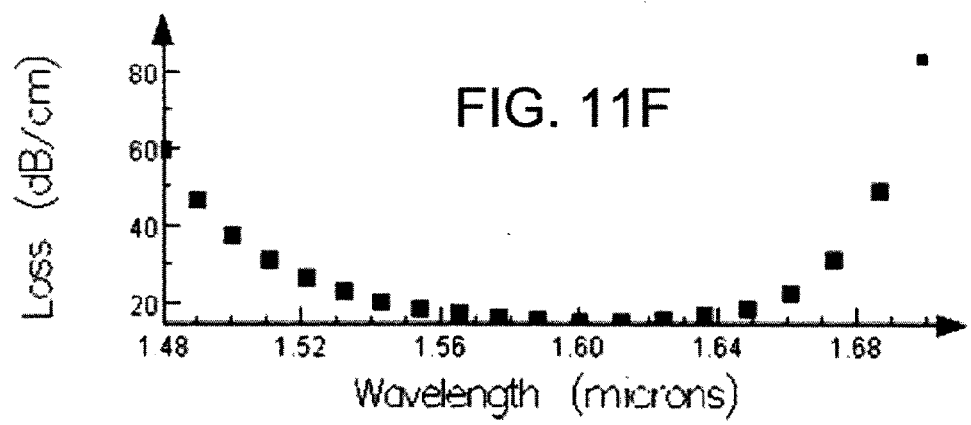

The low-loss bands in FIGS. 11D-F correlate well with the overlapping omnidirectional stop bands shown in FIGS. 10(a)-(d). From the ray optics viewpoint, it is expected that the low loss propagation band should be determined mainly by the overlap of the TE stop bands (of the lower and upper mirror) at ~72 degrees incidence. The low-loss propagation band is also expected to correspond approximately to the omnidirectional stop band of the upper mirror, since guided light is effectively incident on the upper mirror with a range of angles and for both polarization states. Both interpretations are consistent with the numerical and experimental results. The numerical solution predicted ~7 air-guided TE modes; the lowest order (lowest loss) modes are summarized in Table 5. Note that the losses of the TE modes are in reasonable agreement with the predictions of the ray optics model as expected. However, the low-loss bandwidth reduces slightly with increasing mode order. Predicted losses for TM polarized modes are much higher, consistent with our experimental observations.

TABLE 5

Low-order air-guided modes for a 40 μm wide buckled waveguide 10 with raised cosine profile and peak height 2.5 μm, as predicted by a finite difference mode solver at 1600 nm wavelength.

| mode | effective index | loss [dB/cm] |
| --- | --- | --- |
| $TE_0$ (100% TE) | 0.965 | 8.7 |
| $TE_1$ (100% TE) | 0.958 | 11.7 |
| $TE_2$ (100% TE) | 0.950 | 15.1 |
| $TE_3$ (100% TE) | 0.942 | 18.7 |
| $TM_0$ (100% TM) | 0.917 | 440 |

Light propagation was studied experimentally using both a tunable laser and a broadband light source. Source light was passed through fiber-based polarization control optics and then coupled into the hollow waveguides 10 using an objective lens. A second objective lens was used to collect light at the output facet. Output light was delivered to one of a photodetector, an infrared camera, or an optical spectrum analyzer, in the latter case via an iris, a fiber collimating optic, and a short length of standard single mode fiber. To obtain experimental mode field profiles, the magnified near-field images were focused onto an InGaAs CCD camera. The system was calibrated by imaging light from optical fibers with known mode-field diameters. For loss measurements, a multimode fiber (attached to a micropositioner) was used to scan the surface of a chip under test.

Figure 12A:
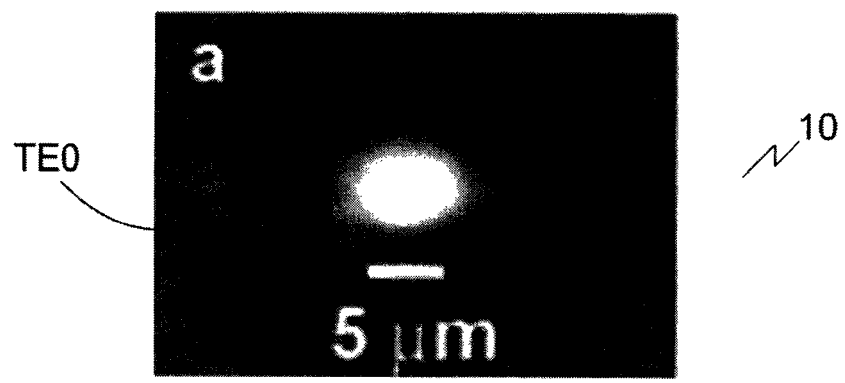
Figure 12B:
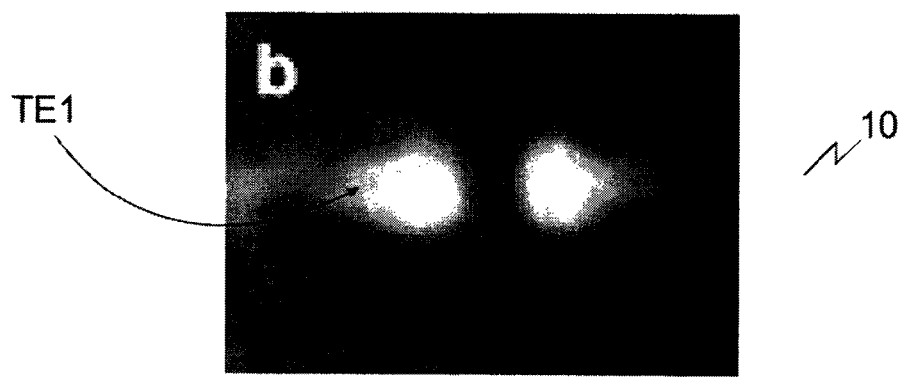
Figure 12C:
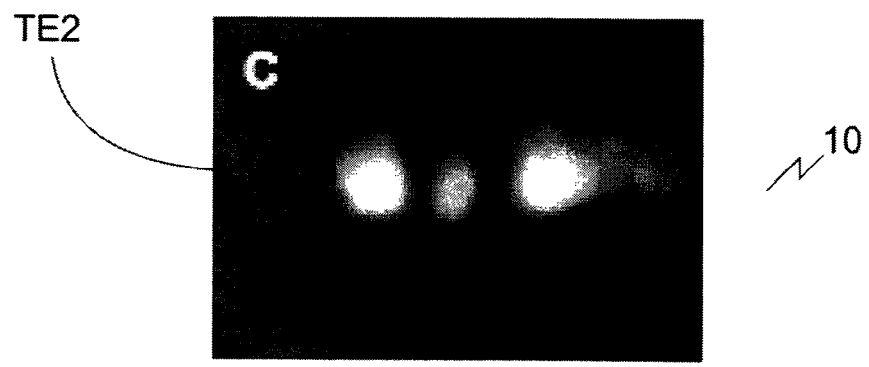

Guiding was verified for buckle base widths in the 20 to 80 μm range. For the reasons discussed above, we focus on results for waveguides 10 with 40 μm base width and for in-plane (TE) polarized light. Experimental near field mode profiles at the output facet of an approximately 5 mm long waveguide 10 are shown in FIGS. 12(a)-(c) for the first three modes TE0, TE1, and TE2, respectively. Consistent with the prediction of several low-loss TE modes, we observed multimode interference effects. By adjusting the input coupling position and laser wavelength, it was possible to excite different mode patterns at the output. The 3 lowest-order mode patterns shown (TE0, TE1, and TE2) are in good qualitative agreement with the results from the finite difference mode solver, and evidence of higher order modes was also observed. An exact quantitative comparison between experiment and theory was limited by the resolving power of the optics and by nonlinearities in the infrared camera.

Figure 12D:
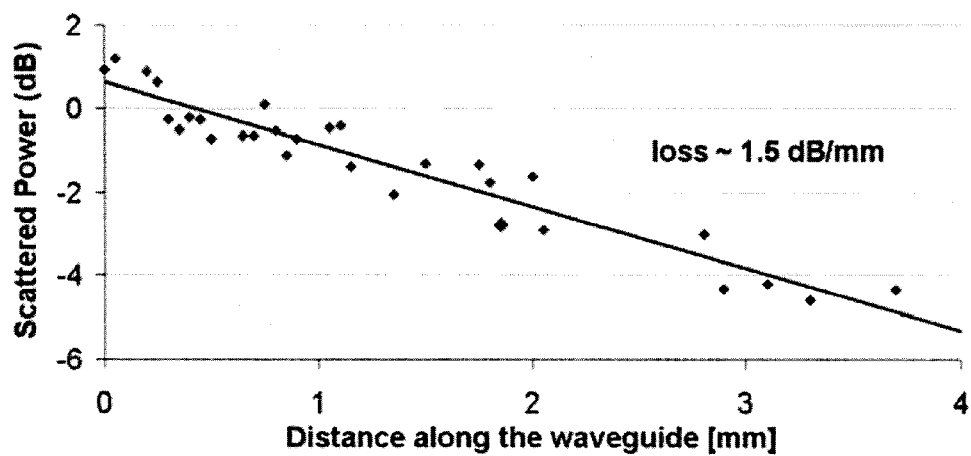
Figure 12E:
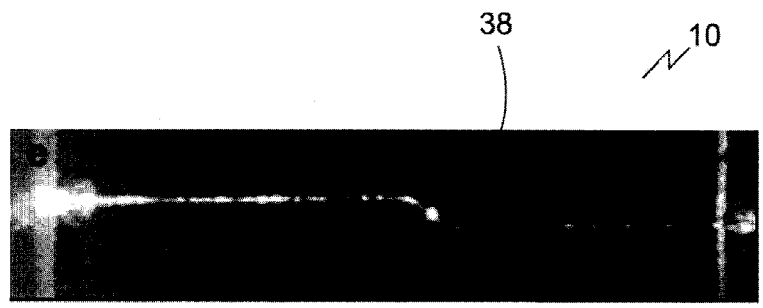

Propagation loss estimated from scattered light was as low as ~1.5 dB/mm (see FIG. 12(d)). This is in reasonable agreement with the theoretical predictions above, suggesting that the loss is mainly determined by the reflectivity of the cladding mirrors. Light guiding through s-bends 38 was also observed (FIG. 12(e)).

Figure 13A:
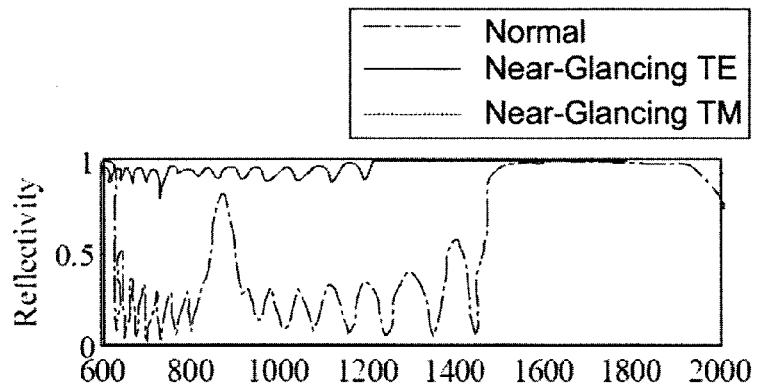
FIGS. 13A-13C. Wavelength dependence of TE polarized light guidance. (a) Simulated reflectivity of the lower ODR cladding, for TE polarized light at normal (green) and near-glancing (blue) incidence. (b) Simulated reflectivity of the upper ODR cladding, for normal incidence (green), and near-glancing incidence for TE (red) and TM (blue) light. (c) Measured transmission versus wavelength through a typical 40 µm wide hollow waveguide, ~5 mm in length.
Figure 13B:
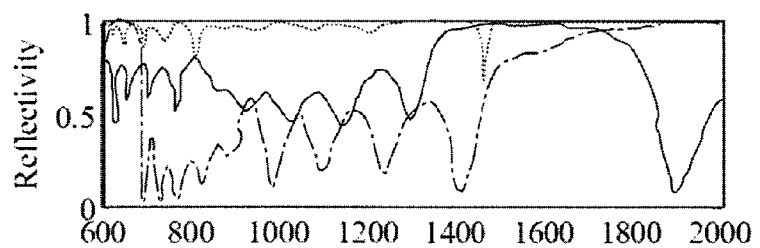
Figure 13C:
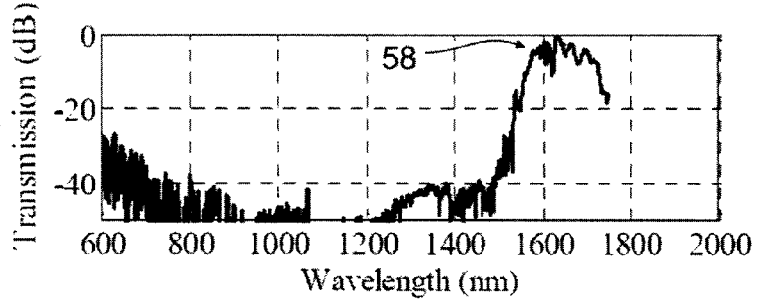

In FIGS. 13(a) and (b), selected theoretical reflectivity curves for the lower and upper cladding mirrors 52 and 54, respectively, are repeated from FIGS. 10A-B and 10C-D. Experimental verification (not shown) was obtained for the bottom mirror, revealing near-perfect agreement above the electronic band edge of the materials. FIG. 13(c) shows the typical transmission versus wavelength through a hollow waveguide 10, with the wavelength response of the test setup removed. A low-loss band 58 in the 1550 to 1700 nm wavelength range was found, with out of band rejection on the order of 40 dB. The position and bandwidth of the transmission passband are well correlated with the omnidirectional reflection bands of the cladding mirrors, in good agreement with the predictions of the finite difference simulation above. Note that the Ag-doped mirrors do not exhibit high reflectivity in the vicinity of the theoretically predicted (neglecting material loss) third order stop band near 700 nm. As a result, the waveguides 10 do not efficiently transmit light in that range.

The loss of the waveguides 10 is comparable to that for other integrated air-core waveguides 10 (with similar core size) reported in the literature. Nevertheless, it is always desirable to reduce loss. This could be achieved by employing higher index contrast mirror materials (implying new process development) or by increasing the number of periods in the mirrors (implying increased process complexity and cost). However, it is known that reflectivity and bandwidth of finite period Bragg mirrors can be greatly increased by adding an 'outer' metallic layer. Preliminary analyses using the models described above predict that, for core dimensions similar to those described here, loss below 1 dB/cm can be achieved using 4-5 period mirrors 'capped' by a thin (~50 nm) metal film.

Compared to conventional methods for fabricating hollow waveguides 10 and microchannels, the approach described has potential advantages. The delamination buckles are driven by energy minimization, form spontaneously, and are quite stable. We have handled some samples extensively and verified their light guiding properties over the course of several months. Long and complex channel layouts (curved, crossing, and tapered channels, etc.) can be realized in a straightforward and parallel process. While not yet verified, it seems likely that the inner walls of buckled channels may exhibit roughness characterized by the film deposition process (which can be sub-nm), highly advantageous for low-loss light guiding and efficient fluid flow. The specific materials used here provide further advantages, including toughness, flexibility, resistance to cracking, and a processing temperature regime that is compatible with back-end integration on electronics. However, the approach described should be transferable to other material combinations, provided means to control compressive stress and interfacial adhesion are available.

The approach represents a new option for fabrication of hollow channels and waveguides 10 on planar platforms. The approach described should enable new opportunities for gas- and liquid-phase photonic integrated circuits.

In a further embodiment, adding thin gold layers to the cladding mirrors can reduce the propagation loss, increase the low-loss bandwidth, and simplify the fabrication process by reducing the overall number of films required. Simulations predict loss on the order of 1 dB/cm or less over ~300 nm bandwidth, for cladding mirrors with as few as 4-5 periods.

In a hollow Bragg waveguide 10, propagation loss is essentially determined by the reflectivity of the dielectric mirrors forming the claddings. In theory (neglecting residual absorption and scattering), propagation loss can be reduced to an arbitrarily low value by increasing the number of periods or the index contrast within the cladding mirrors. However, given the geometrical restrictions for realizing straight-sided buckles and in the interest of fabrication simplicity, it is desirable to reduce the number of required layers. Hybrid metal-dielectric mirrors combine the best features associated with metallic mirrors (ie thinness) and dielectric mirrors (ie. ultra-high reflectivity). Specifically, if a thin metallic film is added as a terminating layer, the stop band reflectivity and bandwidth of a few-period dielectric stack can approach the values associated with an infinite stack.

Using transfer matrix and finite difference simulations, we have assessed the potential benefits of using hybrid mirrors in our self-assembled waveguide process. We considered the role of both absorption and scattering losses in reducing reflectivity. According to the theoretical results, loss <1 dB/cm is feasible for channels with height ~2 μm using a slightly modified fabrication process. Specifically, the addition of two thin metal (Au) layers is predicted to enable a very significant reduction in loss (from ~15 to ~0.5 dB/cm), a significant increase in low-loss bandwidth (from ~100 to ~300 nm), and a reduction in the number of required film deposition steps (from ~32 to ~25).

To illustrate the enhanced performance of hybrid metal-dielectric mirrors, we first present results from a standard transfer matrix model. The planar mirrors considered have high and low index layers of $Ge_{33}As_{12}Se_{55}$ (IG2) glass (photodoped by Ag) and polyamide-imide (PAI) polymer, respectively. Ag doping was assumed to increase the refractive index of the IG2 layers by 0.35, and for simplicity we initially neglected absorption in both the glass and polymer layers (this is discussed further below). The complex optical constants of Au were modeled using a closed-form expression. The simulated reflectivity for 4 period mirrors with and without a terminating Au layer are compared in FIG. 14. The incident IG2 layer of the mirrors was set to be approximately twice as thick as the other IG2 layers, to improve the stop band characteristics for TM light at incidence angles higher than the Brewster angle of the air-IG2 interface (~71 degrees). As discussed below, this comes at the expense of degraded stop band characteristics for TE polarized light, as well as for TM polarized light with incidence angles less than the Brewster angle.

Figure 14:
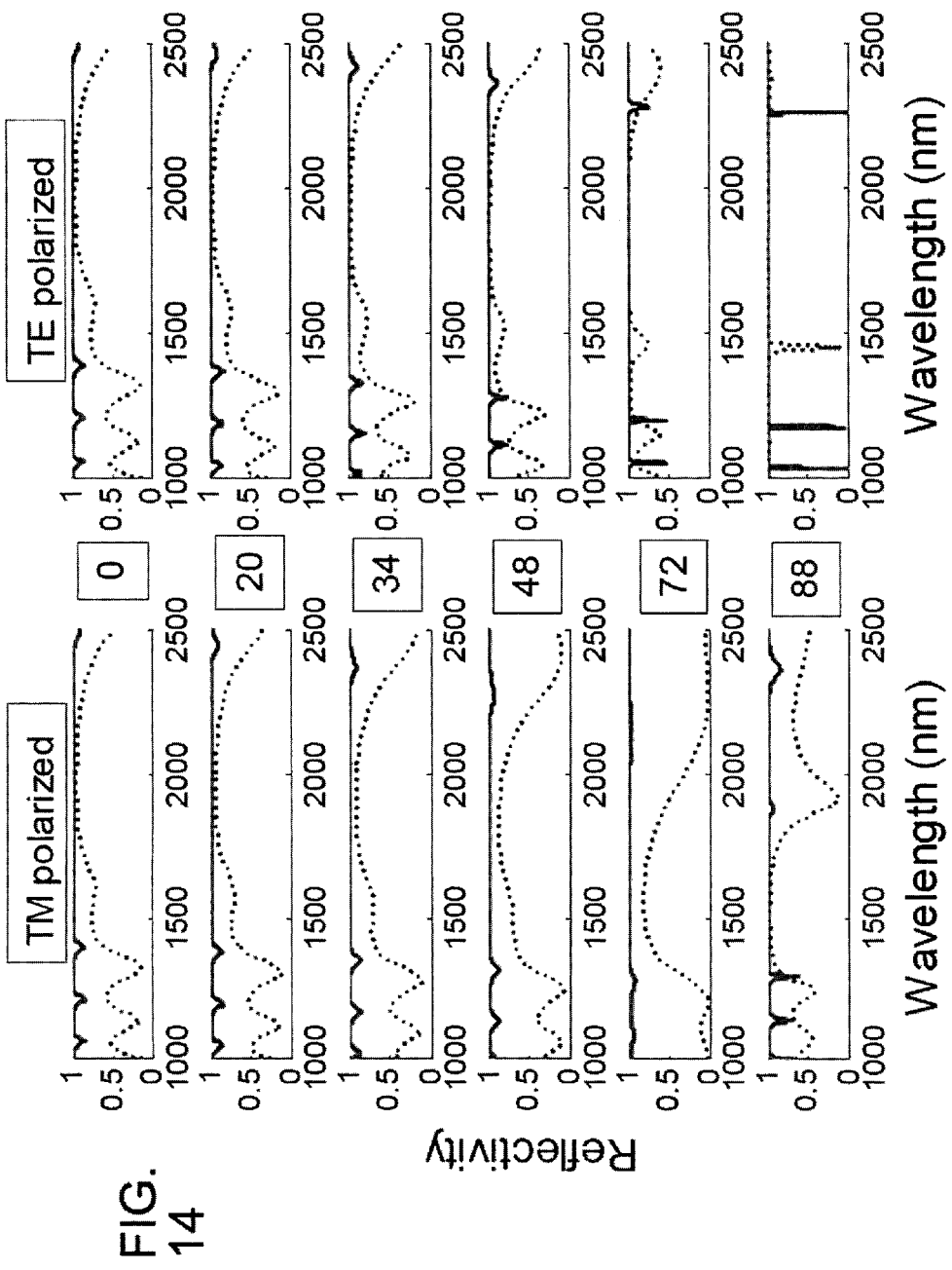
FIG. 14. Reflectivity versus wavelength predicted for 4 period IG2/PAI mirrors, without (dotted line) and with (solid line) a terminating Au layer. The first (incident) IG2 layer was assumed to be 260 nm thick, while the remaining 3 IG2 layers were assumed to be 145 nm thick. All 4 PAI layers (including the one adjacent to the Au in the metal-terminated case) were assumed to be 290 nm thick. The Au layer was assumed 50 nm thick, and both minors were assumed to lie atop a semi-infinite substrate with refractive index 1.5.

As shown in FIG. 14, the non-metallized mirror exhibits far-from-optimal stop band characteristics. Especially for TM polarized light, the peak reflectivity is much less than 1 for most incidence angles. In addition, the use of a double thickness first IG2 layer produces a dip in reflectivity located near 1650 nm for normal incidence light. For TE polarized light, this reflectivity dip becomes narrower but deeper with increasing incidence angle (while shifting to shorter wavelength), and the effective bandwidth of the stop band is reduced relative to the case of a perfectly periodic mirror. The addition of the terminating metal layer dramatically improves the stop band features; the peak reflectivity approaches 1 for both states of polarization, the intraband dip in reflectivity is nearly eliminated, and the stop band exhibits the square shape associated with a dielectric mirror of large period count. Selected data from FIG. 14 is re-plotted as (1-R) versus wavelength in FIGS. 15A-B, so that reflectivities approaching 1 can be compared on a log scale.

While metallic loss was taken into account, the preceding results were obtained under the assumption of ideal (transparent and flat) dielectric layers. For the metal-capped mirror, peak reflectivity >0.9999 is predicted. In practice, residual losses within the dielectric layers will reduce the peak reflectivity relative to the ideal value. These residual losses arise from absorption in the dielectric layers, scattering by rough interfaces, and scattering due to volume inhomogeneities. It should be stressed that fabrication of mirrors with reflectivity on the order of 0.9999 is not trivial. Following are analytical approximations for the absorption and scattering losses in a high reflectivity Bragg mirror:

$$VL \approx 2\pi n_0 \frac{\kappa_H + \kappa_L}{n_H^2 - n_L^2} \quad (6)$$

$$SSL \approx 8\pi^2 \frac{n_0}{n_L} T_{HL}(n_H^2 - n_L^2)\left(\frac{\sigma}{\lambda_0}\right)^2,$$

where VL is the reflectivity reduction due to absorption and volume scattering within the dielectric layers and SSL is the reflectivity reduction due to scattering induced by surface roughness between layers. $n_H$ and $n_L$ are the refractive indices of the high and low index layers (~2.9 and ~1.65 here), and $n_0$ is the index of the incident medium. $K_H$ and $K_L$ are the effective extinction coefficients of the high and low index layers, taking into account both volume absorption and scattering effects. $T_{HL}$ is the Fresnel transmittance for a single interface between a high and low index layer, $\sigma$ is the RMS surface roughness (assumed equal for each interface), and $\lambda_0$ is the free-space wavelength. For a mirror to have R>0.9999, the sum of VL and SSL must be less than $10^{-4}$. Given the indices for the present mirrors, and assuming operation near 1550 nm wavelength, this means that the materials must have low effective extinction coefficients, $(K_H + K_L) < 10^{-4}$, and that the interfaces must have low roughness, $\sigma < 1$ nm.

IG2 glass has very low intrinsic absorption ($K_{IG2} \sim 10^{-7}$) in the 1500 nm wavelength region. Ag photodoping of a chalcogenide glass shifts its band edge to longer wavelengths, but typically causes only a slight increase in absorption in the infrared region. From waveguide studies, it is possible to place an upper bound on the extinction coefficient of PAI in the 1550 nm wavelength range ($K_{PAI} < 10^{-5}$). This is in agreement with loss reported for similar polymers in the 1-1.6-1.8 μm wavelength range; a vibrational overtone of the C—H bond results in higher loss in the 1.6-1.8 μm range. We have previously reported that the RMS roughness of IG2/PAI multilayers is as low as ~0.2 nm. Based on these numbers, it should be feasible to achieve R>0.9999 for IG2/PAI mirrors operating at $\lambda < 1.6$ μm.

Figure 16A:
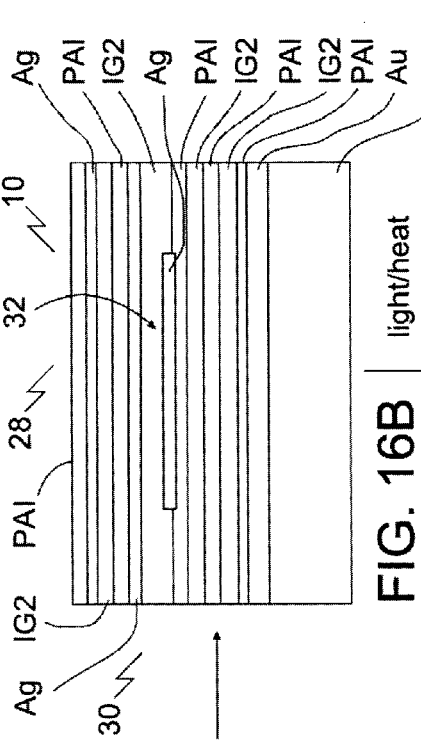
FIGS. 16A-16D. The sequence of steps is shown for producing a buckled hollow waveguide with metal layers terminating the upper and lower cladding minors.
Figure 16B:
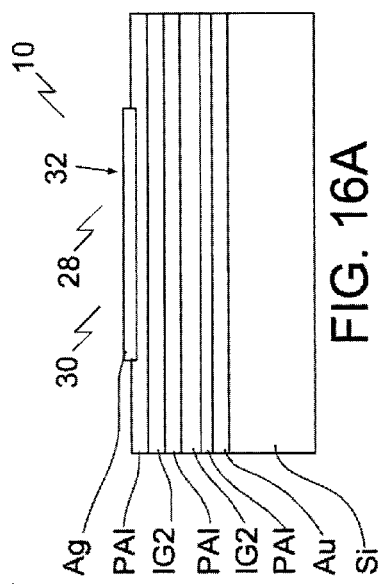
Figure 16C:
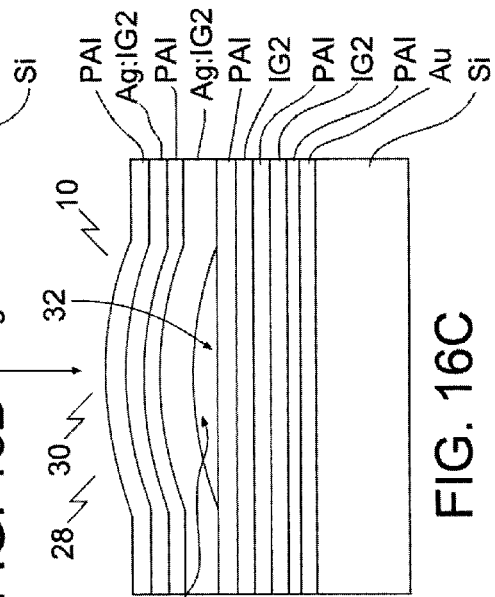
Figure 16D:
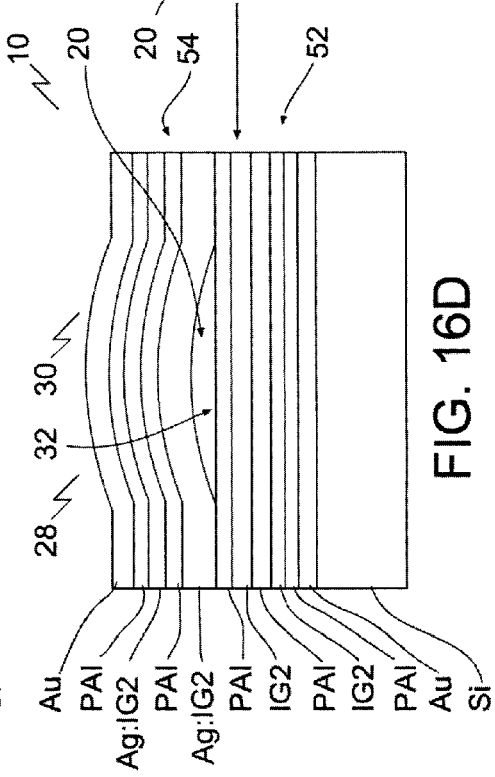

Referring to FIGS. 16A-16D, the hybrid metal-dielectric structures proposed here may be fabricated with only slight modifications to our established process as described in methods 1, 2, and 3. Referring to FIG. 16A, first, a metallized Si substrate is used as a base. The only technological issues for this layer are that the metal chosen must adhere well to the Si substrate and that the subsequent polymer layer must adhere well to the metal. The first issue is easily addressed by using standard metal bi-layers such as Ti—Au or Cr—Au. In the embodiment illustrated in FIGS. 16A-16D, Au is used. With respect to the second issue, one of the attributes of the PAI polymer used is its good adherence to many metals (including Au). Referring to FIG. 16D, the second modification to the process is that a thin Au layer is deposited as the final step, thus having no direct impact on the buckle formation. Since this layer can be very thin, it is not expected to modify the properties of the pre-existing buckles. The wafers can then be coated with a polymer over-layer to provide long-term protection against mechanical or environmental damage (not shown).

Consider hollow waveguides 10 of the type illustrated in FIG. 16D, with a 4 period upper mirror 54 and a 5.5 period lower mirror 52. The higher period count in the bottom mirror compensates for the slightly reduced reflectivity associated with an incident polymer (ie. lower refractive index) layer, and results in nearly equivalent peak reflectivity for the two mirrors. As above, the PAI layers were assumed 290 nm thick, and the Ag:IG2 layers were assumed 145 nm thick. An exception is the first Ag:IG2 layer (nearest the hollow core) in the upper ODR, which was set to a thickness of 260 nm to reduce polarization dependent loss in the waveguides 10. Ag doping was assumed to increase the refractive index of each IG2 layer (in both the upper and lower cladding mirrors) by 0.35. We consider two buckle sizes, with base widths of 20 and 40 p.m. The low height to width aspect ratio of the buckled hollow channels enables reasonably accurate loss predictions using a ray-optics slab model:

$$\alpha \approx \frac{5\lambda}{D^2} \log_{10}(R), \quad (7)$$

where $\alpha$ is loss (due to leakage through the mirrors) in dB/cm, $\lambda$ is free-space wavelength in cm, D is the core thickness in cm, and R is the effective reflectivity of the cladding mirrors at the ray's angle of incidence. We used transfer matrix simulations to estimate the appropriate mirror reflectivities; the losses predicted by equation (7) are summarized in Table 6.

TABLE 6

Estimated propagation loss at λ = 1600 nm, for self-assembled hollow waveguides with two different core sizes and metal-capped mirrors as described in the main text.

| Waveguide base width [μm] | Peak core height, D [μm] | Approximate Ray incidence angle [degrees] | Mirror reflectivity, R | Estimated propagation loss [dB/cm] |
|---|---|---|---|---|
| 20 | 1.8 | 64 | 0.99991 | ~0.96 |
| 40 | 2.5 | 72 | 0.99993 | ~0.39 |

We reiterate that mirror reflectivity >0.9999 is feasible (at least for $\lambda < 1.6$ μm) for the PAI/IG2 material system, but would require a very tightly controlled fabrication process to ensure layer thickness uniformity and to minimize contaminants and roughness.

Figure 17A:
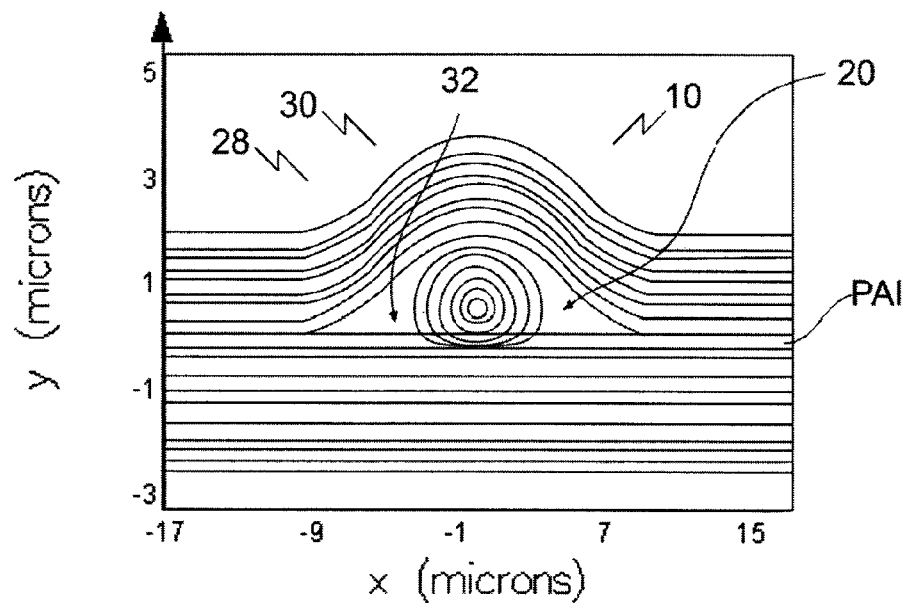
FIGS. 17A-17B. Fundamental air-guided TE mode profiles for a waveguide with 20 µm base width and 1.8 µm peak height, as simulated using finite difference software, at a wavelength of: (a) 1620 nm, showing some penetration of the mode into the lower minor. (b) 1770 nm.
Figure 17B:
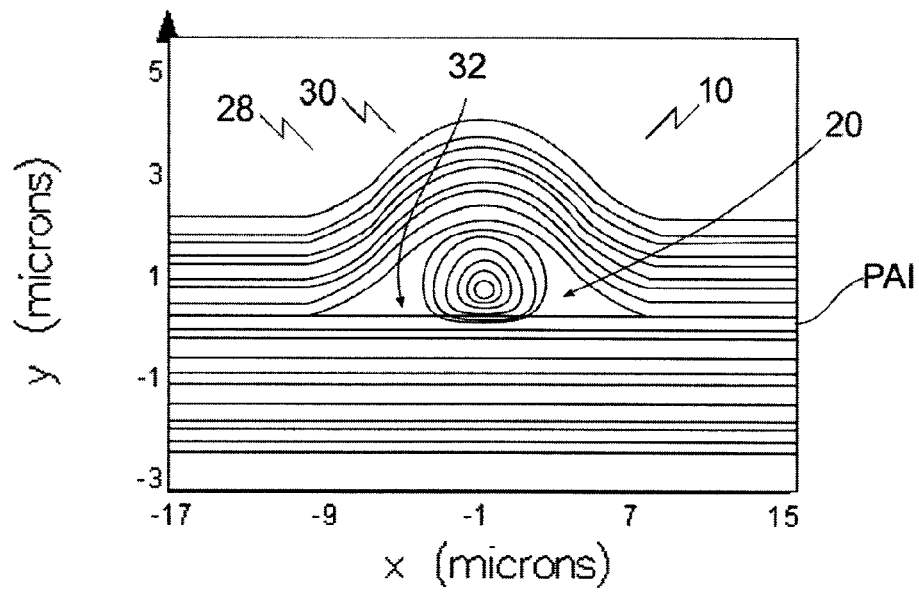

Referring to FIGS. 17A-17B, a more accurate analysis of the waveguides 10 was conducted using a commercial finite difference mode solver (Mode Solutions 2.0, Lumerical Solutions, Inc.). Waveguides 10 with both 20 and 40 μm base width were simulated, using the same layer thicknesses, number of mirror periods, and material parameters described above. Typical fundamental TE mode solutions are shown in FIGS. 17A-B. The mode is well confined to the air core, except for some penetration into the first PAI layer of the bottom mirror (especially nearer the short wavelength side of the guiding pass band).

Figure 18:
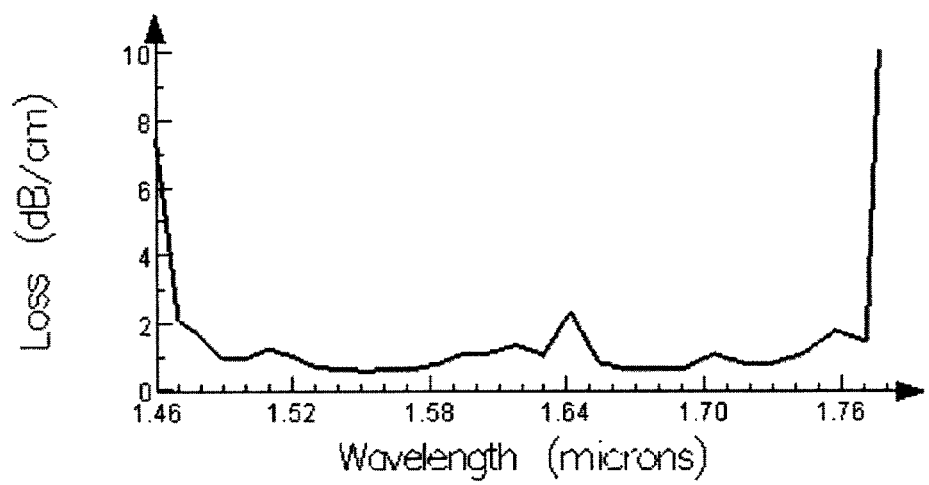
FIG. 18. Propagation loss versus wavelength (predicted by a finite difference numerical solver) is plotted for the fundamental air-guided TE mode of a hollow waveguide with 20 µm base width and 1.8 µm peak height. Au-terminated minors with lossless Ag:IG2 and PAI layers were assumed.

In initial simulations, the Ag:IG2 and PAI layers were assumed lossless. A typical plot of loss versus wavelength for a 20 μm waveguide 10 (peak channel height 1.8 μm) is shown in FIG. 18. The propagation loss in this case is due to absorption in the outer metallic layers (mostly) and radiation through the mirrors. The predicted propagation loss is on the order of 1 dB/cm (as low as ~0.6 dB/cm) over a wavelength range spanning 300 nm. This level of loss is in good agreement with the predictions of the ray optics model.

Next, we considered the impact of lossy IG2 and PAI layers. For simplicity, a fixed extinction coefficient ($k_{PAI}=k_{IG2}$) was assumed across the entire wavelength range simulated. The loss of PAI (and other similar polymers) in the near to mid infrared is mainly attributable to molecular vibrational overtones, and is therefore very wavelength dependent. However, the extinction coefficient of PAI does not exceed $\sim 10^{-5}$ in the main wavelength range of interest here, and that of Ag:IG2 is expected to be even lower. Thus, we use a fixed extinction coefficient on this order as a worst case limiting value.

Figure 19:
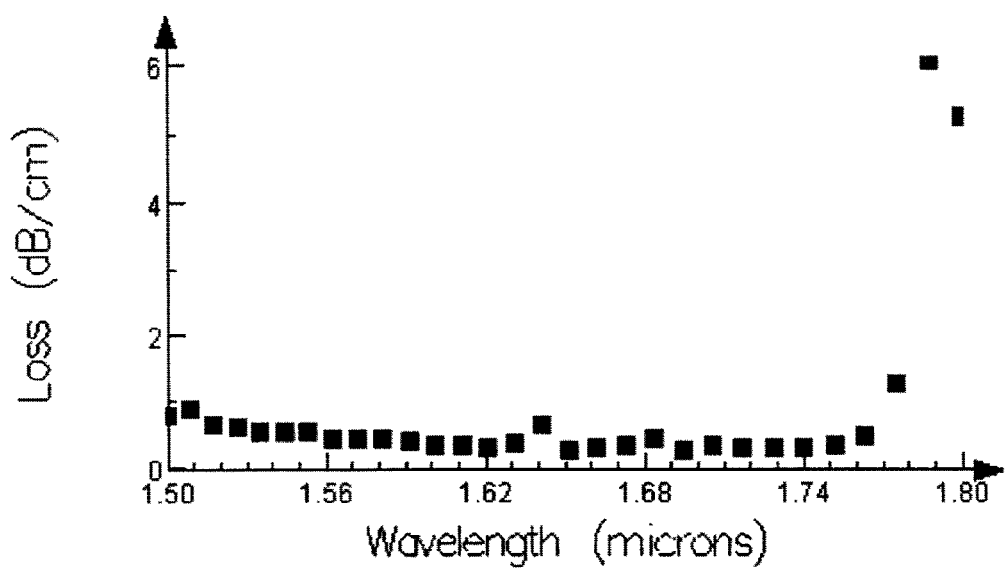
FIG. 19. Propagation loss versus wavelength (predicted by a finite difference numerical solver) is plotted for the fundamental air-guided TE mode of a hollow waveguide with 40 µm base width and 2.5 µm peak height. A fixed extinction coefficient of $10^{-5}$ was assumed for all Ag:IG2 and PAI layers.

FIG. 19 shows a typical plot of loss versus wavelength for a waveguide 10 with 40 base width and 2.5 μm peak channel height. In this case, a nominal Ag:IG2 layer thickness of 130 nm was assumed and the first Ag:IG2 layer in the top cladding was set to 240 nm thick. A fixed extinction coefficient ($k_{PAI}=k_{IG2}=10^{-5}$) was assumed for all of the dielectric layers. For this level of material loss, the propagation loss of the air-guided mode is predicted to be <1 dB/cm over a 300 nm bandwidth. The minimum loss (~0.4 dB/cm) is again in good agreement with the ray optics based prediction above. Note that the propagation loss increases slightly for shorter wavelengths within the pass band, due to the increased penetration of the mode into the bottom mirror discussed above.

Referring to FIGS. 5A-5C, a method of forming a channel 22 is also disclosed. Referring to FIG. 5A, a metal layer is first deposited on a substrate. In the embodiment illustrated in FIG. 5A, the metal layer is illustrated as, for example an Ag layer, and the substrate is illustrated as, for example a PAI layer. The metal layer may comprise a metal film, and may be patterned on the substrate. In addition, as illustrated in FIG. 5A, the substrate may comprise at least one underlayer. Referring to FIG. 5B, an overlayer is deposited onto the substrate over the metal layer. In the embodiment of FIG. 5B, the overlayer is illustrated as, for example, IG2. The overlayer may be, for example, chalcogenide glass. Referring to FIG. 5C, the metal layer is induced to diffuse into the overlayer to form a region of reduced adhesion 36 between the substrate and the overlayer. The overlayer is delaminated from the substrate in the region of reduced adhesion 36 to form the channel 22 between the overlayer and the substrate. The induced diffusion may be caused by the addition of at least one of heat, light, or a change in pressure. In some embodiments, the induced diffusion is caused by the addition of heat and light. Inducing the metal layer to diffuse increases the compressive stress of the overlayer, and causes the overlayer to delaminate from the substrate in the region of reduced adhesion. The channel 22 may comprises a waveguide channel as illustrated.

Another method of forming a channel is disclosed. A multilayer stack of layers is formed with at least two adjacent layers having a patterned region between them. The adhesion of these adjacent layers is lower in the patterned region, compared to the adhesion between these same adjacent layers outside the patterned region. The multilayer stack is delaminated between these adjacent layers in the locations defined by the patterned region to form the channel embedded within the layers.

Patterned region in this document may refer to, for example, a patterned region, patterned separation, or patterned delamination.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of forming a waveguide, the method comprising the steps of:
   forming a multilayer stack of light guiding layers; and
   delaminating the multilayer stack between at least two of the light guiding layers to form a waveguide between the light guiding layers by applying a compressive stress to one or more of the light guiding layers to induce buckling of the one or more of the light guiding layers.

2. A method according to claim 1 in which delaminating of the multilayer stack occurs along a patterned region between light guiding layers.

3. A method according to claim 2 in which the patterned region has converging sides and the waveguide is tapered.

4. A method according to claim 2 in which the patterned region is in the shape of a cross, such that intersecting waveguide channels are formed.

5. A method according to claim 2 in which the patterned region is a circle, such that a dome or ring shaped waveguide channel is formed.

6. A method according to claim 3 in which the patterned region is defined by a region of reduced adhesion between light guiding layers.

7. A method according to claim 6 in which the region of reduced adhesion is created by modifying the adhesion energy of one or more of the light guiding layers.

8. A method according to claim 7 in which the region of reduced adhesion is created by induced diffusion of an embedded metal layer into one or more of the light guiding layers.

9. A method according to claim 6 in which the region of reduced adhesion is created by applying a surface coating to one or more of the light guiding layers.

10. A method according to claim 9 in which the surface coating comprises one or more of perfluoropolyether, fluoroalkysilane, dodecyltrichlorosilane, organosilane, TiC, DLC and SiC.

11. A method according to claim 1 in which the light guiding layers comprise alternating layers of different index of refraction.

12. A method according to claim 11 in which the light guiding layers form omni-directional dielectric reflectors.

13. A method according to claim 12 in which the alternating layers comprise a first material having a relatively low index of refraction and a second material having a relatively high index of refraction.

14. A method according to claim 13 in which the first material comprises silicon dioxide or an organic polymer.

15. A method according to claim 14 in which the second material comprises one or more of chalcogenide glass, amorphous silicon, polycrystalline silicon, silicon nitride and an amorphous metal oxide.

16. A method according to claim 15 further comprising applying a reflective metal layer to at least one of below and above the multilayer stack.

17. A method according to claim 15 further comprising applying a reflective metal layer below and above the multilayer stack.

18. A method according to claim 1 in which the stress is applied by one or more of:

spontaneous release of pre-stressed light guiding layers;
heating of the multilayer stack;
cooling of the multilayer stack; and
changing pressure applied to the multilayer stack.

19. A method according to claim 18 in which the pre-stressed light guiding layers are intrinsically pre-stressed light guiding layers.

20. A method according to claim 1 in which delaminating the multilayer stack comprises applying a compressively stressed overlayer to the multilayer stack.

21. A method according to claim 20 in which the compressively stressed overlayer comprises one or more carbon or metal films.

22. A method according to claim 21 in which the compressively stressed overlayer comprises nickel, stainless steel or tungsten.

23. A method according to claim 20 further comprising adhering the compressively stressed overlayer to the multilayer stack with a thin film.

24. A method according to claim 3 in which the waveguide is tapered in width and height.

\* \* \* \* \*